(12) United States Patent
Altonen et al.

(10) Patent No.: US 9,481,119 B2
(45) Date of Patent: Nov. 1, 2016

(54) INJECTION MOLDING MACHINES AND METHODS FOR ACCOUNTING FOR CHANGES IN MATERIAL PROPERTIES DURING INJECTION MOLDING RUNS

(71) Applicant: iMFLUX Inc., Cincinnati, OH (US)

(72) Inventors: Gene Michael Altonen, West Chester, OH (US); Kimberly Nichole McConnell, Morrow, OH (US); Vincent Sean Breidenbach, Lebanon, OH (US); Milko Georgiev Gergov, Ann Arbor, MI (US)

(73) Assignee: IMFLUX INC., Hamilton, OH (US)

( * ) Notice: Subject to any disclaimer, the term of this patent is extended or adjusted under 35 U.S.C. 154(b) by 113 days.

(21) Appl. No.: 14/448,682

(22) Filed: Jul. 31, 2014

(65) Prior Publication Data

US 2015/0035190 A1      Feb. 5, 2015

Related U.S. Application Data

(60) Provisional application No. 61/861,304, filed on Aug. 1, 2013.

(51) Int. Cl.
*B29C 45/76*    (2006.01)
*B29C 45/77*    (2006.01)
*B29C 45/00*    (2006.01)
*B29K 101/12*   (2006.01)

(52) U.S. Cl.
CPC ........... *B29C 45/77* (2013.01); *B29C 45/0025* (2013.01); *B29C 45/0046* (2013.01); *B29C 45/7613* (2013.01); *B29C 45/7646* (2013.01); *B29C 2945/76006* (2013.01); *B29C 2945/76076* (2013.01); *B29C 2945/76257* (2013.01); *B29C 2945/76381* (2013.01); *B29C 2945/76548* (2013.01); *B29C 2945/76551* (2013.01); *B29C 2945/76561* (2013.01); *B29C 2945/76933* (2013.01); *B29C 2945/76936* (2013.01); *B29K 2101/12* (2013.01)

(58) Field of Classification Search
CPC .......... B29C 2945/76561; B29C 2945/76933; B29C 2945/76257
See application file for complete search history.

(56) References Cited

U.S. PATENT DOCUMENTS 3,628,901 A    12/1971   Paulson
3,642,404 A    2/1972    Nagawa
(Continued)

FOREIGN PATENT DOCUMENTS

DE    102007061775 A1    7/2009

OTHER PUBLICATIONS

International Search Report/Written Opinion for PCT/US2014/049108, P&G Case 13022, mailed Nov. 17, 2014, 11 pages.
(Continued)

*Primary Examiner* — Jill Heitbrink
(74) *Attorney, Agent, or Firm* — Marshall Gerstein & Borun LLP

(57) ABSTRACT

A method and a machine that account for changes in material properties of molten plastic material during an injection run. If viscosity of the molten plastic material changes during an injection run, a controller alters a step time of the injection cycle to ensure that molten plastic material completely fills and packs a mold cavity to prevent part flaws such as short shots or flashing.

18 Claims, 10 Drawing Sheets

(56) References Cited

U.S. PATENT DOCUMENTS

| | | | |
|---|---|---|---|
| 3,695,800 A | 10/1972 | Hutchinson | |
| 3,859,400 A * | 1/1975 | Ma | B29C 45/77 264/40.5 |
| 3,893,792 A | 7/1975 | Laczko | |
| 4,066,725 A | 1/1978 | Boettner | |
| 4,816,197 A * | 3/1989 | Nunn | B29C 45/76 264/40.1 |
| 4,889,667 A | 12/1989 | Kojima | |
| 4,968,462 A | 11/1990 | Hara | |
| 5,419,858 A | 5/1995 | Hata et al. | |
| 5,578,256 A | 11/1996 | Austin | |
| 5,665,283 A | 9/1997 | Bader | |
| 5,853,630 A * | 12/1998 | Hettinga | B29C 45/00 264/328.12 |
| 5,945,046 A * | 8/1999 | Hehl | B22D 17/32 264/40.1 |
| 6,968,240 B2 | 11/2005 | Frey | |
| 7,071,712 B2 | 7/2006 | Frey | |
| 7,166,245 B2 | 1/2007 | Yokoyama | |
| 7,430,923 B2 | 10/2008 | Bader | |
| 7,431,871 B2 | 10/2008 | Frey | |
| 7,476,095 B2 | 1/2009 | Bader | |
| 7,597,827 B2 | 10/2009 | Frey | |
| 7,644,620 B2 | 1/2010 | Bader | |
| 7,682,535 B2 | 3/2010 | Frey | |
| 7,931,837 B2 | 4/2011 | Bader | |
| 8,329,075 B2 | 12/2012 | Bader | |
| 8,828,291 B2 | 9/2014 | Altonen | |
| 8,920,703 B2 | 12/2014 | Bader | |
| 8,980,146 B2 * | 3/2015 | Altonen | B29C 45/77 264/40.1 |
| 2002/0022066 A1 | 2/2002 | Matsubayashi | |
| 2004/0084794 A1 | 5/2004 | Frey | |
| 2006/0022363 A1 | 2/2006 | Konno | |
| 2007/0296102 A1 | 12/2007 | Hofmann | |
| 2009/0278274 A1 * | 11/2009 | Bader | B29C 45/7646 264/40.6 |
| 2010/0252944 A1 * | 10/2010 | Bader | B29C 45/7646 264/40.5 |
| 2012/0187592 A1 * | 7/2012 | Gruber | B29C 45/762 264/40.7 |
| 2012/0292823 A1 | 11/2012 | Altonen | |
| 2012/0294963 A1 | 11/2012 | Altonen | |
| 2012/0295049 A1 | 11/2012 | Altonen | |
| 2012/0295050 A1 | 11/2012 | Altonen | |
| 2012/0328724 A1 | 12/2012 | Altonen | |
| 2012/0329948 A1 | 12/2012 | Altonen | |
| 2013/0069280 A1 | 3/2013 | Altonen | |
| 2013/0113131 A1 | 5/2013 | Altonen | |
| 2013/0221575 A1 | 8/2013 | Altonen | |
| 2013/0334721 A1 | 12/2013 | Bader | |
| 2015/0035189 A1 | 2/2015 | Altonen | |
| 2015/0035190 A1 | 2/2015 | Altonen | |
| 2015/0115491 A1 | 4/2015 | Altonen | |
| 2015/0174803 A1 | 6/2015 | Newman | |
| 2016/0059461 A1 | 3/2016 | Altonen | |
| 2016/0082636 A1 | 3/2016 | Altonen | |
| 2016/0082637 A1 | 3/2016 | Altonen | |
| 2016/0082638 A1 | 3/2016 | Altonen | |
| 2016/0082639 A1 | 3/2016 | Altonen | |
| 2016/0096303 A1 | 4/2016 | Altonen | |

OTHER PUBLICATIONS

International Search Report/Written Opinion for PCT/US2014/049150, P&G Case 13021, mailed Nov. 4, 2014, 9 pages.

International Search Report/Written Opinion for PCT/US2014/049100, P&G Case 13020, mailed Nov. 5, 2014, 4 pages.

All Office Actions, PG Case No. 13020, U.S. Appl. No. 14/176,505, See PAIR.

All Office Actions, PG Case No. 13020D, U.S. Appl. No. 14/659,509, See PAIR.

All Office Actions, PG Case No. 13022, U.S. Appl. No. 14/448,726, See PAIR.

All Office Actions, PG Case No. 13021M, U.S. Appl. No. 14/448,648, See PAIR.

U.S. Appl. No. 14/962,534, Dec. 8, 2015, Ward.

U.S. Appl. No. 14/962,572, Dec. 8, 2015, Ward.

* cited by examiner

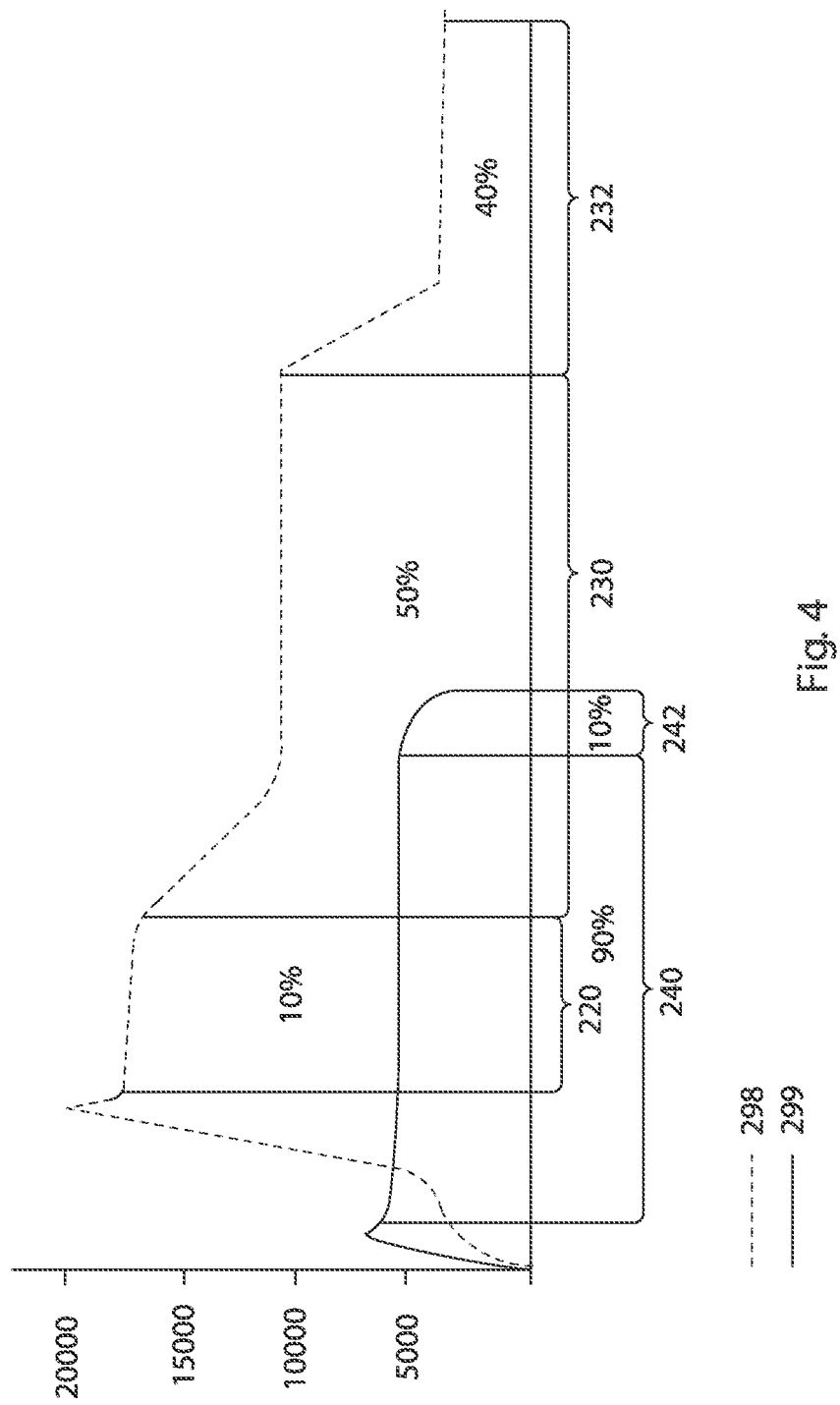

INJECTION MOLDING MACHINES AND METHODS FOR ACCOUNTING FOR CHANGES IN MATERIAL PROPERTIES DURING INJECTION MOLDING RUNS

TECHNICAL FIELD OF THE INVENTION

The present invention relates to injection molding machines and methods of producing injection molded parts and, more particularly, to injection molding machines that adjust operating parameters of the injection molding machine during an injection molding run to account for changes in material properties of the injection material and methods of accounting for changes in injection molding material properties during an injection molding run.

BACKGROUND OF THE INVENTION

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel by a gate, which directs the flow of the molten resin into the cavity. A molded part may have one or more gates. It is common for large parts to have two, three, or more gates to reduce the flow distance the polymer must travel to fill the molded part. The one or multiple gates per cavity may be located anywhere on the part geometry, and possess any cross-section shape such as being essentially circular or be shaped with an aspect ratio of 1.1 or greater. Thus, a typical injection molding procedure comprises four basic operations: (1) heating the plastic in the injection molding machine to allow the plastic to flow under pressure; (2) injecting the melted plastic into a mold cavity or cavities defined between two mold halves that have been closed; (3) allowing the plastic to cool and harden in the cavity or cavities while under pressure; and (4) opening the mold halves and ejecting the part from the mold.

During the injection molding process, the molten plastic resin is injected into the mold cavity and the plastic resin is forcibly injected into the cavity by the injection molding machine until the plastic resin reaches the location in the cavity furthest from the gate. Thereafter, the plastic resin fills the cavity from the end back towards the gate. The resulting length and wall thickness of the part is a result of the shape of the mold cavity.

In some cases, it may be desirous to reduce the wall thickness of injected molded parts to reduce the plastic content, and thus cost, of the final part. Reducing wall thickness using a conventional high variable pressure injection molding process can be an expensive and a non-trivial task. In fact, conventional injection molding machines (e.g. machines injecting molten plastic resin at higher pressures) have a practical limit as to how thin walls of a part may be molded. Generally speaking, conventional injection molding machines cannot mold parts having a thinwall ratio (as defined by an L/T ratio set forth below) of greater than about 200. Furthermore, molding thinwall parts with thinwall ratios of more than 100 requires pressures at the high end of current capability and thus, presses that are capable of handling these high pressures.

When filling a thinwall part, the current industry practice is to fill the mold cavity at the highest possible rate the molding machine can achieve. This approach ensures that the mold cavity is filled before the polymer solidifies or "freezes off" in the mold. This approach has two drawbacks. The first is that to achieve very high filling velocities requires very high power loads, and this requires very expensive molding equipment. Further, most electric presses are unable to provide sufficient power to achieve these high filling rates, or require very complicated and expensive drive systems that substantially increase the cost of the molding equipment making them impractical economically. The second drawback is that the high filling rates require very high pressures. These high pressures result in the need for very high clamping forces to hold the mold closed during filling, and these high clamping forces result in very expensive molding equipment. The high pressures also require injection mold cores that are made from very high strength materials, typically hardened tool steels. These high strength molds are also very expensive, and can be impractical economically for many molded components. Even with these substantial drawbacks, the need for thinwall injection molded components remains high, since these components use less polymer material to form the molded part, thereby resulting in material savings that more than offset the higher equipment costs. Further, some molded components require very thin design elements to perform properly, such as design elements that need to flex, or design elements that must mate with very small features of other design elements.

As a liquid plastic resin is introduced into an injection mold in a conventional injection molding process the material adjacent to the walls of the cavity, immediately begins to "freeze," or solidify, or cure, or in the case of crystalline polymers the plastic resin begins to crystallize, because the liquid plastic resin cools to a temperature below the material's no flow temperature and portions of the liquid plastic become stationary. This frozen material adjacent to the walls of the mold narrows the flow path that the thermoplastic travels as it progresses to the end of the mold cavity. The thickness of the frozen material layer adjacent to the walls of the mold increases as the filling of the mold cavity progresses, this causes a progressive reduction in the cross sectional area the polymer must flow through to continue to fill the mold cavity. As material freezes, it also shrinks, pulling away from the mold cavity walls, which reduces effective cooling of the material by the mold cavity walls. As a result, conventional injection molding machines fill the mold cavity with plastic very quickly and then maintain a packing pressure to force the material outward against the sides of the mold cavity to enhance cooling and to maintain the correct shape of the molded part. Conventional injection molding machines typically have cycle times made up of about 10% injection time, about 50% packing time, and about 40% cooling time.

As plastic freezes in the mold cavity, conventional injection molding machines increase injection pressure (to maintain a substantially constant volumetric flow rate due to the smaller cross-sectional flow area). Increasing the pressure, however, has both cost and performance downsides. As the pressure required to mold the component increases, the molding equipment must be strong enough to withstand the additional pressure, which generally equates to being more expensive. A manufacturer may have to purchase new equipment to accommodate these increased pressures. Thus, a decrease in the wall thickness of a given part can result in significant capital expenses to accomplish the manufacturing via conventional injection molding techniques.

In an effort to avoid some of the drawbacks mentioned above, many conventional injection molding operations use shear-thinning plastic material to improve flow characteristics of the plastic material into the mold cavity. As the shear-thinning plastic material is injected into the mold cavity, shear forces generated between the plastic material and the mold cavity walls tend to reduce viscosity of the plastic material, thereby allowing the plastic material to flow more freely and easily into the mold cavity. As a result, it is possible to fill thinwall parts fast enough to avoid the material completely freezing off before the mold is completely filled.

Reduction in viscosity is directly related to the magnitude of shear forces generated between the plastic material and the feed system, and between the plastic material and the mold cavity wall. Thus, manufacturers of these shear-thinning materials and operators of injection molding systems have been driving injection molding pressures higher in an effort to increase shear, thus reducing viscosity. Typically, high output injection molding systems (e.g., class 101 and class 30 systems) inject the plastic material in to the mold cavity at melt pressures of typically 15,000 psi or more. Manufacturers of shear-thinning plastic material teach injection molding operators to inject the plastic material into the mold cavities above a minimum melt pressure. For example, polypropylene resin is typically processed at pressures greater than 6,000 psi (the recommended range from the polypropylene resin manufacturers, is typically from greater than 6,000 psi to about 15,000 psi). Press manufacturers and processing engineers typically recommend processing shear thinning polymers at the top end of the range, or significantly higher, to achieve maximum potential shear thinning, which is typically greater than 15,000 psi, to extract maximum thinning and better flow properties from the plastic material. Shear thinning thermoplastic polymers generally are processed in the range of over 6,000 psi to about 30,000 psi. Even with the use of shear thinning plastics, a practical limit exists for high variable pressure injection molding of thin walled parts. This limit is currently in the range of thinwall parts having a thinwall ratio of 200 or more. Moreover, even parts having a thinwall ratio of between 100 and 200 may become cost prohibitive as these parts generally require injection pressures between about 15,000 psi and about 20,000 psi.

High production injection molding machines (i.e., class 101 and class 30 molding machines) that produce thinwalled consumer products exclusively use molds having a majority of the mold made from high hardness materials. High production injection molding machines typically experience 500,000 cycles per year or more. Industrial quality production molds must be designed to withstand at least 500,000 cycles per year, preferably more than 1,000,000 cycles per year, more preferably more than 5,000,000 cycles per year, and even more preferably more than 10,000,000 cycles per year. These machines have multi cavity molds and complex cooling systems to increase production rates. The high hardness materials are more capable of withstanding the repeated high pressure clamping operations than lower hardness materials. However, high hardness materials, such as most tool steels, have relatively low thermal conductivities, generally less than 20 BTU/HR FT ° F., which leads to long cooling times as heat is transferred through from the molten plastic material through the high hardness material.

Even with the ever increasing injection pressure ranges of existing high variable pressure injection molding machines, a practical limit remains of about 200 (L/T ratio) for molding thinwalled parts in conventional high (e.g., 20,000 psi) variable pressure injection molding machines and thinwall parts having a thinwall ratio of between about 100 and about 200 may be cost prohibitive for many manufacturers.

Changes in molding conditions can significantly affect properties of the molten plastic material. More specifically, changes in environmental conditions (such as changes in temperature) can raise or lower the viscosity of the molten plastic material. When viscosity of the molten plastic material changes, quality of the molded part may be impacted. For example, if the viscosity of the molten plastic material increases the molded part may experience a short shot, or a shortage of molten plastic material. On the other hand, if the viscosity of the molten plastic material decreases the molded part may experience flashing as the thinner molten plastic material is pressed into the seam of the mold cavity. Furthermore, recycled plastic material that is mixed with virgin material may change a melt flow index (MFI) of the combined plastic material. Conventional injection molding machines do not adjust operating parameters to account for these changes in material properties. As a result, conventional injection molding machines can produce lower quality parts, which must be removed during quality-control inspections, thereby leading to operational inefficiencies.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 is another cavity pressure vs. time graph for the injection molding machine of FIG. 1 superimposed over a cavity pressure vs. time graph for a conventional injection molding machine, the graphs illustrating the percentage of fill time devoted to certain fill steps;

DETAILED DESCRIPTION OF THE INVENTION

Figure 1:
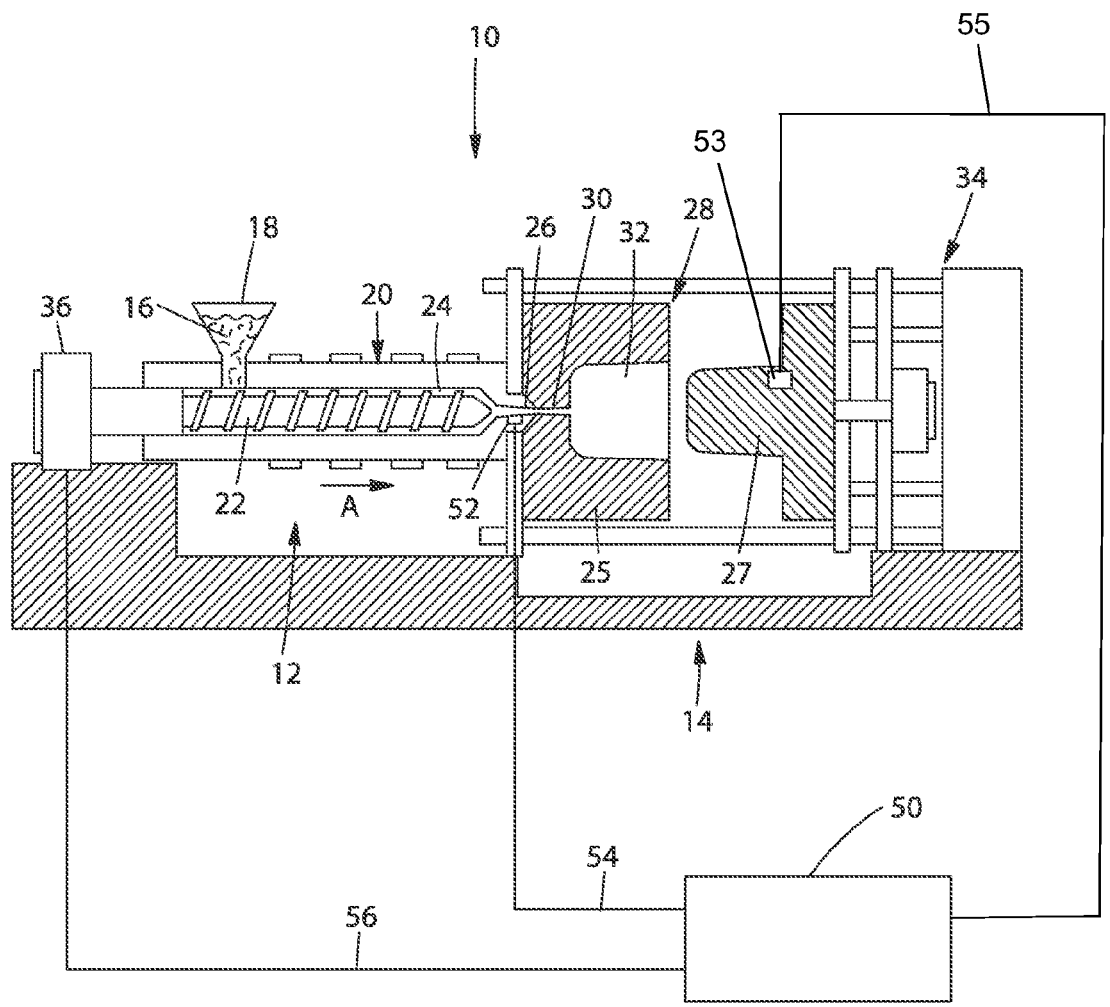
FIG. 1 illustrates a schematic view of an injection molding machine constructed according to the disclosure.

Embodiments of the present invention generally relate to systems, machines, products, and methods of producing products by injection molding and more specifically to systems, products, and methods of producing products by low substantially constant pressure injection molding. However, the devices and methods for accounting for viscosity changes in the molten plastic material described herein are not limited to low substantially constant pressure injection molding machines and processes. Rather, the disclosed devices and methods for accounting for viscosity changes in the molten plastic material may be incorporated into virtually any injection molding machine or process, including, but not limited to, high pressure processes, low pressure processes, variable pressure processes, and constant or substantially constant pressure processes.

The term "low pressure" as used herein with respect to melt pressure of a thermoplastic material, means melt pressures in a vicinity of a nozzle of an injection molding machine of 15,000 psi and lower.

The term "substantially constant pressure" as used herein with respect to a melt pressure of a thermoplastic material, means that deviations from a baseline melt pressure do not produce meaningful changes in physical properties of the thermoplastic material. For example, "substantially constant pressure' includes, but is not limited to, pressure variations for which viscosity of the melted thermoplastic material do not meaningfully change. The term "substantially constant" in this respect includes deviations of approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

The term "melt holder", as used herein, refers to the portion of an injection molding machine that contains molten plastic in fluid communication with the machine nozzle. The melt holder is heated, such that a polymer may be prepared and held at a desired temperature. The melt holder is connected to a power source, for example a hydraulic cylinder or electric servo motor, that is in communication with a central control unit, and can be controlled to advance a diaphragm to force molten plastic through the machine nozzle. The molten material then flows through the runner system in to the mold cavity. The melt holder may be cylindrical in cross section, or have alternative cross sections that will permit a diaphragm to force polymer under pressures that can range from as low as 100 psi to pressures 40,000 psi or higher through the machine nozzle. The diaphragm may optionally be integrally connected to a reciprocating screw with flights designed to plasticize polymer material prior to injection.

The term "high L/T ratio" generally refers to L/T ratios of 100 or greater, and more specifically to L/T ratios of 200 or greater, but less than 1000. Calculation of the L/T ratio is defined below.

The term "peak flow rate" generally refers to the maximum volumetric flow rate, as measured at the machine nozzle.

The term "peak injection rate" generally refers to the maximum linear speed the injection ram travels in the process of forcing polymer in to the feed system. The ram can be a reciprocating screw such as in the case of a single stage injection system, or a hydraulic ram such as in the case of a two stage injection system.

The term "ram rate" generally refers to the linear speed the injection ram travels in the process of forcing polymer into the feed system.

The term "flow rate" generally refers to the volumetric flow rate of polymer as measured at the machine nozzle. This flow rate can be calculated based on the ram rate and ram cross sectional area, or measured with a suitable sensor located in the machine nozzle.

The term "cavity percent fill" generally refers to the percentage of the cavity that is filled on a volumetric basis. For example, if a cavity is 95% filled, then the total volume of the mold cavity that is filled is 95% of the total volumetric capacity of the mold cavity.

The term "melt temperature" generally refers to the temperature of the polymer that is maintained in the melt holder, and in the material feed system when a hot runner system is used, which keeps the polymer in a molten state. The melt temperature varies by material, however, a desired melt temperature is generally understood to fall within the ranges recommended by the material manufacturer.

The term "gate size" generally refers to the cross sectional area of a gate, which is formed by the intersection of the runner and the mold cavity. For hot runner systems, the gate can be of an open design where there is no positive shut off of the flow of material at the gate, or a closed design where a valve pin is used to mechanically shut off the flow of material through the gate in to the mold cavity (commonly referred to as a valve gate). The gate size refers to the cross sectional area, for example a 1 mm gate diameter refers to a cross sectional area of the gate that is equivalent to the cross sectional area of a gate having a 1 mm diameter at the point the gate meets the mold cavity. The cross section of the gate may be of any desired shape.

The term "effective gate area" generally refers to a cross sectional area of a gate corresponding to an intersection of the mold cavity and a material flow channel of a feed system (e.g., a runner) feeding thermoplastic to the mold cavity. The gate could be heated or not heated. The gate could be round, or any cross sectional shape, suited to achieve the desired thermoplastic flow into the mold cavity.

The term "intensification ratio" generally refers to the mechanical advantage the injection power source has on the injection ram forcing the molten polymer through the machine nozzle. For hydraulic power sources, it is common that the hydraulic piston will have a 10:1 mechanical advantage over the injection ram. However, the mechanical advantage can range from ratios much lower, such as 2:1, to much higher mechanical advantage ratio such as 50:1.

The term "peak power" generally refers to the maximum power generated when filling a mold cavity. The peak power may occur at any point in the filling cycle. The peak power is determined by the product of the plastic pressure as measured at the machine nozzle multiplied by the flow rate as measured at the machine nozzle. Power is calculated by the formula P=p*Q where p is pressure and Q is volumetric flow rate.

The term "volumetric flow rate" generally refers to the flow rate as measured at the machine nozzle. This flow rate can be calculated based on the ram rate and ram cross sectional area, or measured with a suitable sensor located in the machine nozzle.

The terms "filled" and "full," when used with respect to a mold cavity including thermoplastic material, are interchangeable and both terms mean that thermoplastic material has stopped flowing into the mold cavity.

The term "shot size" generally refers to the volume of polymer to be injected from the melt holder to completely fill the mold cavity or cavities. The Shot Size volume is determined based on the temperature and pressure of the polymer in the melt holder just prior to injection. In other words, the shot size is a total volume of molten plastic material that is injected in a stroke of an injection molding ram at a given temperature and pressure. Shot size may include injecting molten plastic material into one or more injection cavities through one or more gates. The shot of molten plastic material may also be prepared and injected by one or more melt holders.

The term "hesitation" generally refers to the point at which the velocity of the flow front is minimized sufficiently to allow a portion of the polymer to drop below its no flow temperature and begin to freeze off.

The term "electric motor" or "electric press," when used herein includes both electric servo motors and electric linear motors.

The term "Peak Power Flow Factor" refers to a normalized measure of peak power required by an injection molding system during a single injection molding cycle and the Peak Power Flow Factor may be used to directly compare power requirements of different injection molding systems. The Peak Power Flow Factor is calculated by first determining the Peak Power, which corresponds to the maximum product of molding pressure multiplied by flow rate during the filling cycle (as defined herein), and then determining the Shot Size for the mold cavities to be filled. The Peak Power Flow Factor is then calculated by dividing the Peak Power by the Shot Size.

The term "low constant pressure injection molding machine" is defined as a class 101 or a class 30 injection molding machine that uses a substantially constant injection pressure that is less than 15,000 psi. Alternatively, the term "low constant pressure injection molding machine" may be defined as an injection molding machine that uses a substantially constant injection pressure that is less than 15,000 psi and that is capable of performing more than 1 million cycles, preferably more than 1.25 million cycles, more preferably more than 2 million cycles, more preferably more than 5 million cycles, and even more preferably more than 10 million cycles before the mold core (which is made up of first and second mold parts that define a mold cavity therebetween) reaches the end of its useful life. Characteristics of "low constant pressure injection molding machines" include mold cavities having an L/T ratio of greater than 100 (and preferably greater than 200), multiple mold cavities (preferably 4 mold cavities, more preferably 16 mold cavities, more preferably 32 mold cavities, more preferably 64 mold cavities, more preferably 128 mold cavities and more preferably 256 mold cavities, or any number of mold cavities between 4 and 512), a heated runner, and a guided ejection mechanism.

The term "useful life" is defined as the expected life of a mold part before failure or scheduled replacement. When used in conjunction with a mold part or a mold core (or any part of the mold that defines the mold cavity), the term "useful life" means the time a mold part or mold core is expected to be in service before quality problems develop in the molded part, before problems develop with the integrity of the mold part (e.g., galling, deformation of parting line, deformation or excessive wear of shut-off surfaces), or before mechanical failure (e.g., fatigue failure or fatigue cracks) occurs in the mold part. Typically, the mold part has reached the end of its "useful life" when the contact surfaces that define the mold cavity must be discarded or replaced. The mold parts may require repair or refurbishment from time to time over the "useful life" of a mold part and this repair or refurbishment does not require the complete replacement of the mold part to achieve acceptable molded part quality and molding efficiency. Furthermore, it is possible for damage to occur to a mold part that is unrelated to the normal operation of the mold part, such as a part not being properly removed from the mold and the mold being force ably closed on the non-ejected part, or an operator using the wrong tool to remove a molded part and damaging a mold component. For this reason, spare mold parts are sometimes used to replace these damaged components prior to them reaching the end of their useful life. Replacing mold parts because of damage does not change the expected useful life.

The term "guided ejection mechanism" is defined as a dynamic part that actuates to physically eject a molded part from the mold cavity.

The term "coating" is defined as a layer of material less than 0.13 mm (0.005 in) in thickness, that is disposed on a surface of a mold part defining the mold cavity, that has a primary function other than defining a shape of the mold cavity (e.g., a function of protecting the material defining the mold cavity, or a function of reducing friction between a molded part and a mold cavity wall to enhance removal of the molded part from the mold cavity).

The term "average thermal conductivity" is defined as the thermal conductivity of any materials that make up the mold cavity or the mold side or mold part. Materials that make up coatings, stack plates, support plates, and gates or runners, whether integral with the mold cavity or separate from the mold cavity, are not included in the average thermal conductivity. Average thermal conductivity is calculated on a volume weighted basis.

The term "effective cooling surface" is defined as a surface through which heat is removed from a mold part. One example of an effective cooling surface is a surface that defines a channel for cooling fluid from an active cooling system. Another example of an effective cooling surface is an outer surface of a mold part through which heat dissipates to the atmosphere. A mold part may have more than one effective cooling surface and thus may have a unique average thermal conductivity between the mold cavity surface and each effective cooling surface.

The term "nominal wall thickness" is defined as the theoretical thickness of a mold cavity if the mold cavity were made to have a uniform thickness. The nominal wall thickness may be approximated by the average wall thickness. The nominal wall thickness may be calculated by integrating length and width of the mold cavity that is filled by an individual gate.

The term "average hardness" is defined as the Rockwell hardness for any material or combination of materials in a desired volume. When more than one material is present, the average hardness is based on a volume weighted percentage of each material. Average hardness calculations include hardnesses for materials that make up any portion of the mold cavity. Average hardness calculations do not include materials that make up coatings, stack plates, gates or runners, whether integral with a mold cavity or not, and support plates. Generally, average hardness refers to the volume weighted hardness of material in the mold cooling region.

The term "mold cooling region" is defined as a volume of material that lies between the mold cavity surface and an effective cooling surface.

The term "cycle time" or "injection molding cycle" is defined as a single iteration of an injection molding process that is required to fully form an injection molded part. Cycle time or injection molding cycle includes the steps of advancing molten thermoplastic material into a mold cavity, substantially filling the mold cavity with thermoplastic material, cooling the thermoplastic material, separating first and second mold sides to expose the cooled thermoplastic material, removing the thermoplastic material, and closing the first and second mold sides.

The term "injection molding run," as used herein, includes a series of sequential injection molding cycles that are performed on a common injection molding machine.

The term "flowability," as used herein, includes the flow resistance of a molten plastic material as it flows through an injection molding system and accounts for all influences on the relative viscosity of the molten plastic material, including, but not limited to, composition of the molten plastic material, temperature, shear, mold design, and part design.

The term "step time" is defined as the time between the start of an injection molding cycle and an end of an injection molding cycle. The start of an injection molding cycle is the moment in time when injection of molten plastic material is initiated. The end of an injection molding cycle is the moment just before the mold is opened for ejection of the molded part. In other words, the end of an injection molding cycle is the moment that injection pressure is removed from the plastic material in the mold.

Low constant pressure injection molding machines may also be high productivity injection molding machines (e.g., a class 101 or a class 30 injection molding machine, or an "ultra high productivity molding machine"), such as the high productivity injection molding machine disclosed in U.S. patent application Ser. No. 13/601,514, filed Aug. 31, 2012, which is hereby incorporated by reference herein, that may be used to produce thinwalled consumer products, such as toothbrush handles and razor handles. Thin walled parts are generally defined as having a high L/T ratio of 100 or more.

Referring to the figures in detail, FIG. 1 illustrates an exemplary low constant pressure injection molding apparatus 10 that generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28 via one or more gates 30, preferably three or less gates, that direct the flow of the molten thermoplastic material 24 to the mold cavity 32. In other embodiments the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a nozzle sensor 52, located in the vicinity of the nozzle 26, a flow front sensor 53, located within the mold cavity 32 or proximate the mold cavity 32, and a screw control 36. The controller 50 may include a microprocessor, a memory, and one or more communication links. The flow front sensor 53 may provide an indication of the location of a leading edge or flow front of the molten thermoplastic material flowing into the mold cavity 32. While the flow front sensor 53 is illustrated near an end of the mold cavity 32 (e.g., the location in the mold cavity that is last to fill with molten plastic material) in FIG. 1, the flow front sensor 53 may be located at any point in the mold cavity 32 between a gate and the location in the mold cavity 32 that is last to fill with molten thermoplastic material. If the flow front sensor 53 is not located near the end of the mold cavity 32, a time correction factor may be applied to approximate when the flow front of the molten plastic material will reach the end of the mold cavity 32. It may be desirable to locate the flow front sensor 53 within 30% of the end of the mold cavity 32, preferably within 20% of the end of the mold cavity 32, and more preferably within 10% of the end of the mold cavity 32. The nozzle sensor 52 and the flow front sensor 53 may sense the presence of thermoplastic material optically, pneumatically, electrically, ultrasonically, mechanically or otherwise by sensing pressure and/or temperature changes due to the arrival of the flow front of the thermoplastic material. When pressure or temperature of the thermoplastic material is measured by the nozzle sensor 52, the nozzle sensor 52 may send a signal indicative of the pressure or the temperature to the controller 50 to provide a target pressure for the controller 50 to maintain in the mold cavity 32 (or in the nozzle 26) as the fill is completed. This signal may generally be used to control the molding process, such that variations in material viscosity, mold temperatures, melt temperatures, and other variations influencing filling rate, are adjusted by the controller 50. These adjustments may be made immediately during the molding cycle, or corrections can be made in subsequent cycles. Furthermore, several signals may be averaged over a number of cycles and then used to make adjustments to the molding process by the controller 50. The controller 50 may be connected to the nozzle sensor 52, and/or the flow front sensor 53, and the screw control 36 via wired connections 54, 55, 56, respectively. In other embodiments, the controller 50 may be connected to the nozzle sensors 52, to the flow front sensor 53, and to the screw control 56 via a wireless connection, a mechanical connection, a hydraulic connection, a pneumatic connection, or any other type of communication connection known to those having ordinary skill in the art that will allow the controller 50 to communicate with both the sensors 52, 53 and the screw control 36.

In the embodiment of FIG. 1, the nozzle sensor 52 is a pressure sensor that measures (directly or indirectly) melt pressure of the molten thermoplastic material 24 in vicinity of the nozzle 26. The nozzle sensor 52 generates an electrical signal that is transmitted to the controller 50. The controller 50 then commands the screw control 36 to advance the screw 22 at a rate that maintains a desired melt pressure of the molten thermoplastic material 24 in the nozzle 26. This is known as a pressure controlled process. While the nozzle sensor 52 may directly measure the melt pressure, the nozzle sensor 52 may also indirectly measure the melt pressure by measuring other characteristics of the molten thermoplastic material 24, such as temperature, viscosity, flow rate, etc, which are indicative of melt pressure. Likewise, the nozzle sensor 52 need not be located directly in the nozzle 26, but rather the nozzle sensor 52 may be located at any location within the injection system 12 or mold 28 that is fluidly connected with the nozzle 26. If the nozzle sensor 52 is not located within the nozzle 26, appropriate correction factors may be applied to the measured characteristic to calculate an estimate of the melt pressure in the nozzle 26. The nozzle sensor 52 need not be in direct contact with the injected fluid and may alternatively be in dynamic communication with the fluid and able to sense the pressure of the fluid and/or other fluid characteristics. If the nozzle sensor 52 is not located within the nozzle 26, appropriate correction factors may be applied to the measured characteristic to calculate the melt pressure in the nozzle 26. In yet other embodiments, the nozzle sensor 52 need not be disposed at a location that is fluidly connected with the nozzle. Rather, the nozzle sensor 52 could measure clamping force generated by the clamping system 14 at a mold parting line between the first and second mold parts 25, 27. In one aspect the controller 50 may maintain the pressure according to the input from nozzle sensor 52. Alternatively, the sensor could measure an electrical power demand by an electric press, which may be used to calculate an estimate of the pressure in the nozzle 26.

Although an active, closed loop controller 50 is illustrated in FIG. 1, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent overpressurization of the mold 28. Another alternative mechanism for preventing overpressurization of the mold 28 is an alarm that is activated when an overpressurization condition is detected.

Figure 2:
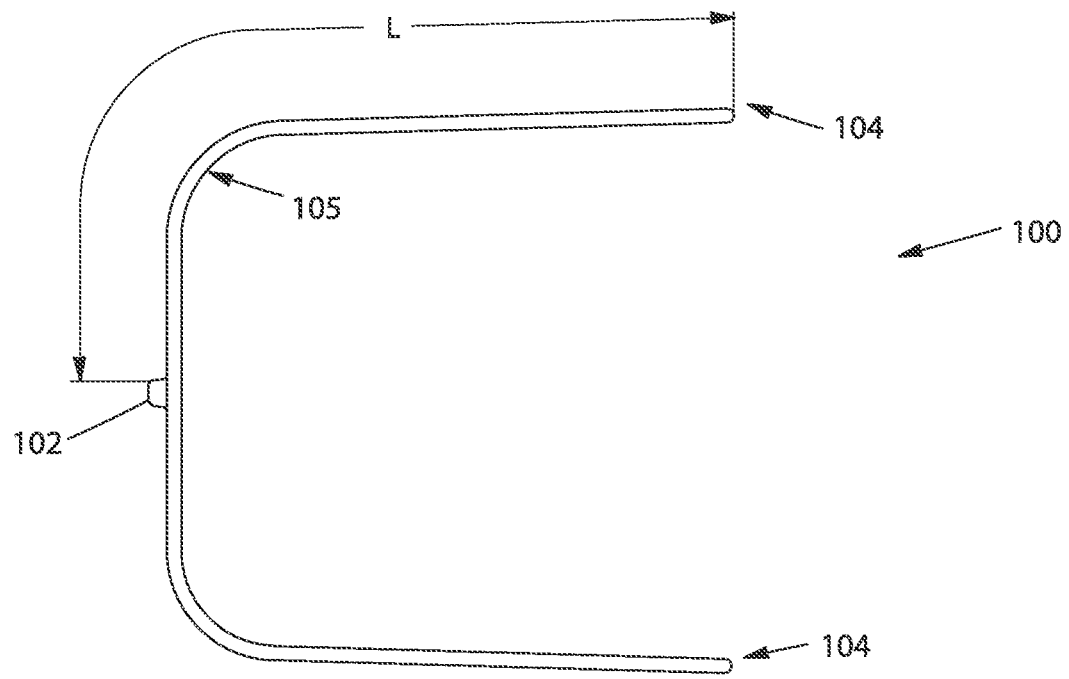
FIG. 2 illustrates one embodiment of a thin-walled part formed in the injection molding machine of FIG. 1.

Turning now to FIG. 2, an example molded part 100 is illustrated. The molded part 100 is a thin-walled part. Molded parts are generally considered to be thin-walled when a length of a flow channel L divided by a thickness of the flow channel T is greater than 100 (i.e., L/T>100), but less than 1000. For mold cavities having a more complicated geometry, the L/T ratio may be calculated by integrating the T dimension over the length of the mold cavity 32 from the gate 30 to the end of the mold cavity 32, and determining the longest length of flow from the gate 30 to the end of the mold cavity 32. The L/T ratio can then be determined by dividing the longest length of flow by the average part thickness. In the case where a mold cavity 32 has more than one gate 30, the L/T ratio is determined by integrating L and T for the portion of the mold cavity 32 filled by each individual gate and the overall L/T ratio for a given mold cavity is the highest L/T ratio that is calculated for any of the gates. In some injection molding industries, thin-walled parts may be defined as parts having an L/T>100, or having an L/T>200, but <1000. The length of the flow channel L is the longest flow length as measured from the gate 30 to the end 104 of the mold cavity. Thin-walled parts are especially prevalent in the consumer products industry.

High L/T ratio parts are commonly found in molded parts having average thicknesses less than about 10 mm. In consumer products, products having high L/T ratios generally have an average thickness of less than about 5 mm. For example, while automotive bumper panels having a high L/T ratio generally have an average thickness of 10 mm or less, tall drinking glasses having a high L/T ratio generally have an average thickness of about 5 mm or less, containers (such as tubs or vials) having a high L/T ratio generally have an average thickness of about 3 mm or less, bottle cap enclosures having a high L/T ratio generally have an average thickness of about 2 mm or less, and individual toothbrush bristles having a high L/T ratio generally have an average thickness of about 1 mm or less. The low constant pressure injection molding processes and devices disclosed herein are particularly advantageous for parts having a thickness of 5 mm or less and the disclosed processes and devices are more advantageous for thinner parts.

Thin-walled parts with high L/T ratios present certain obstacles in injection molding. For example, the thinness of the flow channel tends to cool the molten thermoplastic material before the material reaches the flow channel end 104. When this happens, the thermoplastic material freezes off and no longer flows, which results in an incomplete part. To overcome this problem, traditional injection molding machines inject the molten thermoplastic material at very high pressures, typically greater than 15,000 psi, so that the molten thermoplastic material rapidly fills the mold cavity before having a chance to cool and freeze off. This is one reason that manufacturers of the thermoplastic materials teach injecting at very high pressures. Another reason traditional injection molding machines inject at high pressures is the increased shear, which increases flow characteristics, as discussed above. These very high injection pressures require the use of very hard materials to form the mold 28 and the feed system, among other things. Moreover, the thin walled parts may include one or more special features 105, such as a living hinge, a filament, a closure, a dispenser, a spout, a bellows, and an actuator, that must be filled before the material freezes.

When filling at a substantially constant pressure (during an injection molding cycle), it was generally thought that the filling rates would need to be reduced relative to conventional filling methods. This means the polymer would be in contact with the cool molding surfaces for longer periods before the mold would completely fill. Thus, more heat would need to be removed before filling, and this would be expected to result in the material freezing off before the mold is filled. It has been unexpectedly discovered that the thermoplastic material will flow when subjected to substantially constant pressure conditions, during an injection molding cycle, despite a portion of the mold cavity being below the no-flow temperature of the thermoplastic material. It would be generally expected by one of ordinary skill in the art that such conditions would cause the thermoplastic material to freeze and plug the mold cavity rather than continue to flow and fill the entire mold cavity. Without intending to be bound by theory, it is believed that the substantially constant pressure conditions, during an injection molding cycle, of embodiments of the disclosed method and device allow for dynamic flow conditions (i.e., constantly moving melt front) throughout the entire mold cavity during filling. There is no hesitation in the flow of the molten thermoplastic material as it flows to fill the mold cavity and, thus, no opportunity for freeze-off of the flow despite at least a portion of the mold cavity being below the no-flow temperature of the thermoplastic material.

Additionally, it is believed that as a result of the dynamic flow conditions, the molten thermoplastic material is able to maintain a temperature higher than the no-flow temperature, despite being subjected to such temperatures in the mold cavity, as a result of shear heating. It is further believed that the dynamic flow conditions interfere with the formation of crystal structures in the thermoplastic material as it begins the freezing process. Crystal structure formation increases the viscosity of the thermoplastic material, which can prevent suitable flow to fill the cavity. The reduction in crystal structure formation and/or crystal structure size can allow for a decrease in the thermoplastic material viscosity as it flows into the cavity and is subjected to the low temperature of the mold that is below the no-flow temperature of the material.

The disclosed low constant pressure injection molding methods and systems may use a sensor (such as the flow front sensor 53 in FIG. 1 above) located within the mold cavity or proximate the mold cavity to monitor changes in material viscosity, changes in material temperature, and changes in other material properties. Measurements from this sensor may be communicated to the controller to allow the controller to correct the process in real time to ensure the melt front pressure is relieved prior to the melt front reaching the end of the mold cavity, which can cause flashing of the mold, and another pressure and power peak. Moreover, the controller may use the sensor measurements to adjust the peak power and peak flow rate points in the process, so as to achieve consistent processing conditions. In addition to using the sensor measurements to fine tune the process in real time during the current injection cycle, the controller may also to adjust the process over time (e.g., over a plurality of injection cycles). In this way, the current injection cycle can be corrected based on measurements occurring during one or more cycles at an earlier point in time. In one embodiment, sensor readings can be averaged over many cycles so as to achieve process consistency.

In various embodiments, the mold can include a cooling system that maintains the entire mold cavity at a temperature below the no-flow temperature. For example, even surfaces of the mold cavity which contact the shot comprising molten thermoplastic material can be cooled to maintain a lower temperature. Any suitable cooling temperature can be used. For example, the mold can be maintained substantially at room temperature. Incorporation of such cooling systems can advantageously enhance the rate at which the as-formed injection molded part is cooled and ready for ejection from the mold.

Thermoplastic Material:

A variety of thermoplastic materials can be used in the low constant pressure injection molding methods and devices of the disclosure. In one embodiment, the molten thermoplastic material has a viscosity, as defined by the melt flow index of about 0.1 g/10 min to about 500 g/10 min, as measured by ASTM D1238 performed at temperature of about 230 C with a 2.16 kg weight. For example, for polypropylene the melt flow index can be in a range of about 0.5 g/10 min to about 200 g/10 min. Other suitable melt flow indexes include about 1 g/10 min to about 400 g/10 min, about 10 g/10 min to about 300 g/10 min, about 20 to about 200 g/10 min, about 30 g/10 min to about 100 g/10 min, about 50 g/10 min to about 75 g/10 min, about 0.1 g/10 min to about 1 g/10 min, or about 1 g/10 min to about 25 g/10 min. The MFI of the material is selected based on the application and use of the molded article. For examples, thermoplastic materials with an MFI of 0.1 g/10 min to about 5 g/10 min may be suitable for use as preforms for Injection Stretch Blow Molding (ISBM) applications. Thermoplastic materials with an MFI of 5 g/10 min to about 50 g/10 min may be suitable for use as caps and closures for packaging articles. Thermoplastic materials with an MFI of 50 g/10 min to about 150 g/10 min may be suitable for use in the manufacture of buckets or tubs. Thermoplastic materials with an MFI of 150 g/10 min to about 500 g/10 min may be suitable for molded articles that have extremely high L/T ratios such as a thin plate. Manufacturers of such thermoplastic materials generally teach that the materials should be injection molded using melt pressures in excess of 6000 psi, and often in great excess of 6000 psi. Contrary to conventional teachings regarding injection molding of such thermoplastic materials, embodiments of the low constant pressure injection molding method and device of the disclosure advantageously allow for forming quality injection molded parts using such thermoplastic materials and processing at melt pressures below 15,000 psi, and possibly well below 15,000 psi.

The thermoplastic material can be, for example, a polyolefin. Exemplary polyolefins include, but are not limited to, polypropylene, polyethylene, polymethylpentene, and polybutene-1. Any of the aforementioned polyolefins could be sourced from bio-based feedstocks, such as sugarcane or other agricultural products, to produce a bio-polypropylene or bio-polyethylene. Polyolefins advantageously demonstrate shear thinning when in a molten state. Shear thinning is a reduction in viscosity when the fluid is placed under compressive stress. Shear thinning can beneficially allow for the flow of the thermoplastic material to be maintained throughout the injection molding process. Without intending to be bound by theory, it is believed that the shear thinning properties of a thermoplastic material, and in particular polyolefins, results in less variation of the materials viscosity when the material is processed at constant pressures. As a result, embodiments of the method and device of the disclosure can be less sensitive to variations in the thermoplastic material, for example, resulting from colorants and other additives as well as processing conditions. This decreased sensitivity to batch-to-batch variations of the properties thermoplastic material can also advantageously allow post-industrial and post consumer recycled plastics to be processed using embodiments of the method and the device of the disclosure. Post-industrial, post consumer recycled plastics are derived from end products that have completed their life cycle as a consumer item and would otherwise have been disposed of as a solid waste product. Such recycled plastic, and blends of thermoplastic materials, inherently have significant batch-to-batch variation of their material properties.

The thermoplastic material can also be, for example, a polyester. Exemplary polyesters include, but are not limited to, polyethylene terphthalate (PET). The PET polymer could be sourced from bio-based feedstocks, such as sugarcane or other agricultural products, to produce a partially or fully bio-PET polymer. Other suitable thermoplastic materials include copolymers of polypropylene and polyethylene, and polymers and copolymers of thermoplastic elastomers, polyester, polystyrene, polycarbonate, poly(acrylonitrile-butadiene-styrene), poly(lactic acid), bio-based polyesters such as poly(ethylene furanate) polyhydroxyalkanoate, poly(ethylene furanoate), (considered to be an alternative to, or drop-in replacement for, PET), polyhydroxyalkanoate, polyamides, polyacetals, ethylene-alpha olefin rubbers, and styrene-butadiene-styrene block copolymers. The thermoplastic material can also be a blend of multiple polymeric and non-polymeric materials. The thermoplastic material can be, for example, a blend of high, medium, and low molecular weight polymers yielding a multi-modal or bi-modal blend. The multi-modal material can be designed in a way that results in a thermoplastic material that has superior flow properties yet has satisfactory chemo/physical properties. The thermoplastic material can also be a blend of a polymer with one or more small molecule additives. The small molecule could be, for example, a siloxane or other lubricating molecule that, when added to the thermoplastic material, improves the flowability of the polymeric material.

Other additives may include inorganic fillers such calcium carbonate, calcium sulfate, talcs, clays (e.g., nanoclays), aluminum hydroxide, CaSiO3, glass formed into fibers or microspheres, crystalline silicas (e.g., quartz, novacite, crystallobite), magnesium hydroxide, mica, sodium sulfate, lithopone, magnesium carbonate, iron oxide; or, organic fillers such as rice husks, straw, hemp fiber, wood flour, or wood, bamboo or sugarcane fiber.

Other suitable thermoplastic materials include renewable polymers such as nonlimiting examples of polymers produced directly from organisms, such as polyhydroxyalkanoates (e.g., poly(beta-hydroxyalkanoate), poly(3-hydroxybutyrate-co-3-hydroxyvalerate, NODAX (Registered Trademark)), and bacterial cellulose; polymers extracted from plants, agricultural and forest, and biomass, such as polysaccharides and derivatives thereof (e.g., gums, cellulose, cellulose esters, chitin, chitosan, starch, chemically modified starch, particles of cellulose acetate), proteins (e.g., zein, whey, gluten, collagen), lipids, lignins, and natural rubber; thermoplastic starch produced from starch or chemically starch and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The suitable thermoplastic materials may include a blend or blends of different thermoplastic materials such in the examples cited above. As well the different materials may be a combination of materials derived from virgin bio-derived or petroleum-derived materials, or recycled materials of bio-derived or petroleum-derived materials. One or more of the thermoplastic materials in a blend may be biodegradable. And for non-blend thermoplastic materials that material may be biodegradable.

Exemplary thermoplastic resins together with their recommended operating pressure ranges are provided in the following table:

| Material | Full Name | Injection Pressure Range (PSI) | Company | Material Brand Name |
|---|---|---|---|---|
| pp | Polypropylene | 10000-15000 | RTP Imagineering Plastics | RTP 100 series Polypropylene |
| Nylon | | 10000-18000 | RTP Imagineering Plastics | RTP 200 series Nylon |
| ABS | Acrylonitrile Butadiene Styrene | 8000-20000 | Marplex | Astalac ABS |
| PET | Polyester | 5800-14500 | Asia International | AIE PET 401F |
| Acetal Co-polymer | | 7000-17000 | API Kolon | Kocetal |
| PC | Polycarbonate | 10000-15000 | RTP Imagineering Plastics | RTP 300 series Polycarbonate |
| PS | Polystyrene | 10000-15000 | RTP Imagineering Plastics | RTP 400 series |
| SAN | Styrene Acrylonitrile | 10000-15000 | RTP Imagineering Plastics | RTP 500 series |
| PE | LDPE & HDPE | 10000-15000 | RTP Imagineering Plastics | RTP 700 Series |
| TPE | Thermoplastic Elastomer | 10000-15000 | RTP Imagineering Plastics | RTP 1500 series |
| PVDF | Polyvinylidene Fluoride | 10000-15000 | RTP Imagineering Plastics | RTP 3300 series |
| PTI | Polytrimethylene Terephthalate | 10000-15000 | RTP Imagineering Plastics | RTP 4700 series |
| PBT | Polybutylene Terephthalate | 10000-15000 | RTP Imagineering Plastics | RTP 1000 series |
| PLA | Polylactic Acid | 8000-15000 | RTP Imagineering Plastics | RTP 2099 series |

While more than one of the embodiments involves filling substantially the entire mold cavity with the shot comprising the molten thermoplastic material while maintaining the melt pressure of the shot comprising the molten thermoplastic material at a substantially constant pressure during the injection molding cycle, specific thermoplastic materials benefit from the invention at different constant pressures. Specifically: PP, nylon, PC, PS, SAN, PE, TPE, PVDF, PTI, PBT, and PLA at a substantially constant pressure of less than 10000 psi; ABS at a substantially constant pressure of less than 8000 psi; PET at a substantially constant pressure of less than 5800 psi; Acetal copolymer at a substantially constant pressure of less than 7000 psi; plus poly(ethylene furanate) polyhydroxyalkanoate, polyethylene furanoate (aka PEF) at substantially constant pressure of less than 10000 psi, or 8000 psi, or 7000 psi or 6000 psi, or 5800 psi.

As described in detail above, embodiments of the disclosed low constant pressure injection molding method and device can achieve one or more advantages over conventional injection molding processes. For example, embodiments include a more cost effective and efficient process that eliminates the need to balance the pre-injection pressures of the mold cavity and the thermoplastic materials, a process that allows for use of atmospheric mold cavity pressures and, thus, simplified mold structures that eliminate the necessity of pressurizing means, the ability to use lower hardness, high thermal conductivity mold cavity materials that are more cost effective and easier to machine, a more robust processing method that is less sensitive to variations in the temperature, viscosity, and other material properties of the thermoplastic material, and the ability to produce quality injection molded parts at substantially constant pressures without premature hardening of the thermoplastic material in the mold cavity and without the need to heat or maintain constant temperatures in the mold cavity.

Figure 3:
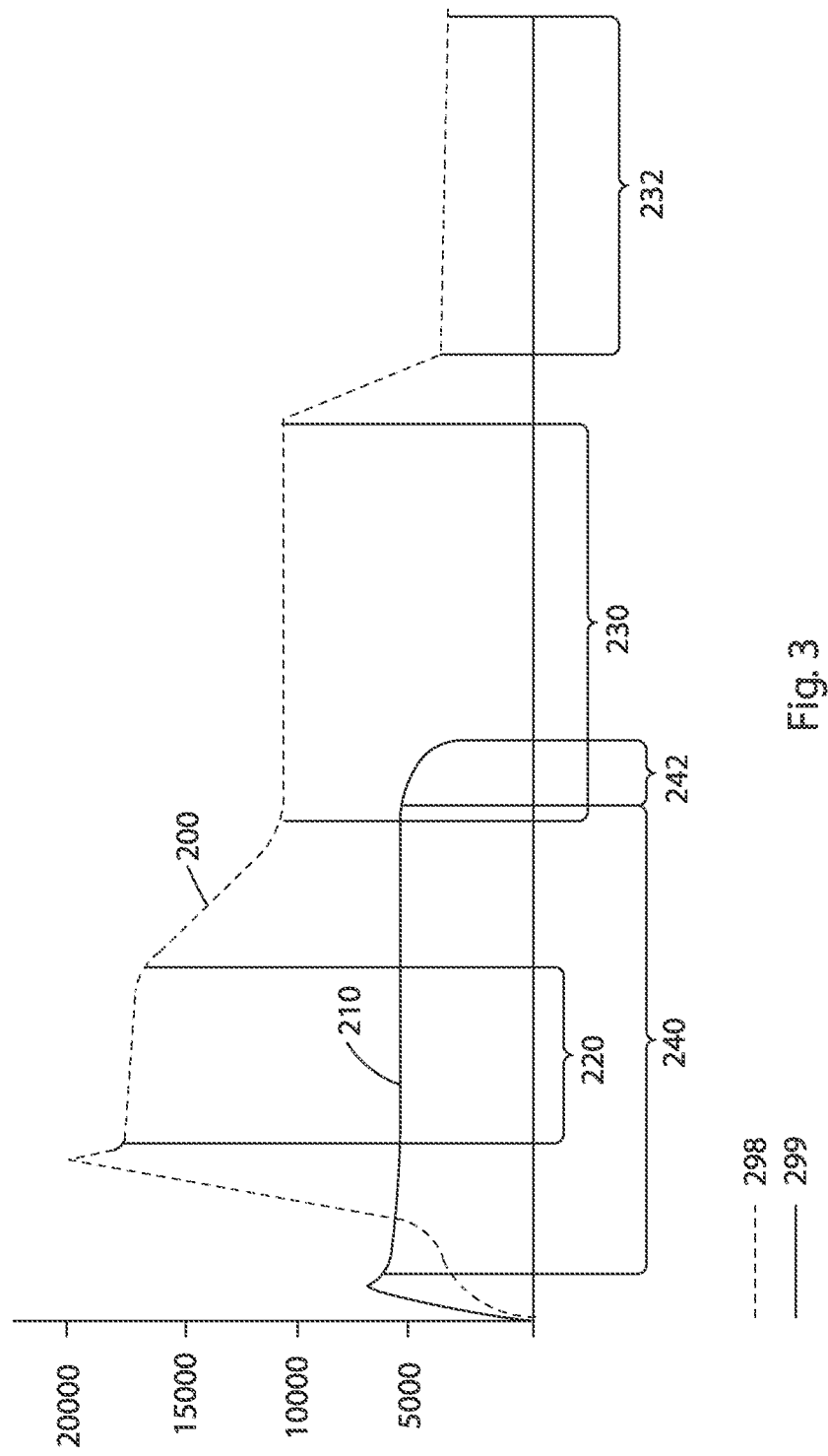
FIG. 3 is a cavity pressure vs. time graph for the injection molding machine of FIG. 1 superimposed over a cavity pressure vs. time graph for a conventional injection molding machine.

Turning now to FIG. 3, a typical pressure-time curve for a conventional high variable pressure injection molding process is illustrated by the dashed line 200. By contrast, a pressure-time curve for the disclosed low constant pressure injection molding machine is illustrated by the solid line 210. In the conventional case, melt pressure is rapidly increased to well over 15,000 psi and then held at a relatively high pressure, more than 15,000 psi, for a first period of time 220. The first period of time 220 is the fill time in which molten plastic material flows into the mold cavity. Thereafter, the melt pressure is decreased and held at a lower pressure, typically 10,000 psi or more, for a second period of time 230. The second period of time 230 is a packing time in which the melt pressure is maintained to ensure that all gaps in the mold cavity are back filled. After packing is complete, the pressure may optionally be dropped again for a third period of time 232, which is the cooling time. The mold cavity in a conventional high variable pressure injection molding system is packed from the end of the flow channel back to towards the gate. The material in the mold typically freezes off near the end of the cavity, then completely frozen off region of material progressively moves toward the gate location, or locations. As a result, the plastic near the end of the mold cavity is packed for a shorter time period and with reduced pressure, than the plastic material that is closer to the gate location, or locations. Part geometry, such as very thin cross sectional areas midway between the gate and end of mold cavity, can also influence the level of packing pressure in regions of the mold cavity. Inconsistent packing pressure may cause inconsistencies in the finished product, as discussed above. Moreover, the conventional packing of plastic in various stages of solidification results in some non-ideal material properties, for example, molded-in stresses, sink, and non-optimal optical properties.

The low constant pressure injection molding system, on the other hand, injects the molten plastic material into the mold cavity at a substantially constant pressure for a fill time period 240. The injection pressure in the example of FIG. 3 is less than 6,000 psi. However, other embodiments may use higher pressures. After the mold cavity is filled, the low constant pressure injection molding system gradually reduces pressure over a second time period 242 as the molded part is cooled. By using a substantially constant pressure during an injection molding cycle, the molten thermoplastic material maintains a continuous melt flow front that advances through the flow channel from the gate towards the end of the flow channel. In other words, the molten thermoplastic material remains moving throughout the mold cavity, which prevents premature freeze off. Thus, the plastic material remains relatively uniform at any point along the flow channel, which results in a more uniform and consistent finished product. By filling the mold with a relatively uniform pressure, the finished molded parts form crystalline structures that may have better mechanical and optical properties than conventionally molded parts. Moreover, the parts molded at constant pressures exhibit different characteristics than skin layers of conventionally molded parts. As a result, parts molded under constant pressure may have better optical properties than parts of conventionally molded parts.

Turning now to FIG. 4, the various stages of fill are broken down as percentages of overall fill time. For example, in an conventional high variable pressure injection molding process, the fill period 220 makes up about 10% of the total fill time, the packing period 230 makes up about 50% of the total fill time, and the cooing period 232 makes up about 40% of the total fill time. On the other hand, in the low constant pressure injection molding process, the fill period 240 makes up about 90% of the total fill time while the cooling period 242 makes up only about 10% of the total fill time. The low constant pressure injection molding process needs less cooling time because the molten plastic material is cooling as it is flowing into the mold cavity. Thus, by the time the mold cavity is filled, the molten plastic material has cooled significantly, although not quite enough to freeze off in the center cross section of the mold cavity, and there is less total heat to remove to complete the freezing process. Additionally, because the molten plastic material remains liquid throughout the fill, and packing pressure is transferred through this molten center cross section, the molten plastic material remains in contact with the mold cavity walls (as opposed to freezing off and shrinking away). As a result, the low constant pressure injection molding process described herein is capable of filling and cooling a molded part in less total time than in a conventional injection molding process.

In the disclosed low constant pressure injection molding method and device for molding a high L/T part, the part is molded by injecting a molten thermoplastic polymer into a mold cavity at an increasing flow rate to achieve a desired injection pressure and then decreasing the flow rate over time to maintain a substantially constant injection pressure. The low constant pressure injection molding method and device are particularly advantageous when molding thinwall parts (e.g., parts having an L/T ratio>100<1000) and when using shot sizes of between 0.1 g and 100 g. It is especially advantageous that the maximum flow rate occur within the first 30% of cavity fill, preferably within the first 20% of cavity fill, and even more preferably within the first 10% of cavity fill. By adjusting the filling pressure profile the maximum flow rate occurs within these preferred ranges of cavity fill, the molded part will have at least some of the physical advantages described above (e.g., better strength, better optical properties, etc.) because the crystalline structure of the molded part is different from a conventionally molded part. Moreover, because high L/T products are thinner, these products require less pigment to impart a desired color to the resulting product. Furthermore, in no-pigment parts, the parts will have less visible deformities due to the more consistent molding conditions. Using less or no pigment saves costs.

Alternatively, the peak power may be adjusted to maintain a substantially constant injection pressure. More specifically, the filling pressure profile may be adjusted to cause the peak power to occur in the first 30% of the cavity fill, preferably in the first 20% of the cavity fill, and even more preferably in the first 10% of the cavity fill. Adjusting the process to cause the peak power to occur within the preferred ranges, and then to have a decreasing power throughout the remainder of the cavity fill results in the same benefits for the molded part that were described above with respect to adjusting peak flow rate. Moreover, adjusting the process in the manner described above is particularly advantageous for thinwall parts (e.g., L/T ratio>100<1000) and for shot sizes of between 0.1 g and 100 g).

Turning now to FIGS. 5A-5D and FIGS. 6A-6D a portion of a mold cavity as it is being filled by a conventional injection molding machine (FIGS. 5A-5D) and as it is being filled by a substantially constant pressure injection molding machine (FIGS. 6A-6D) is illustrated.

Figure 5A:
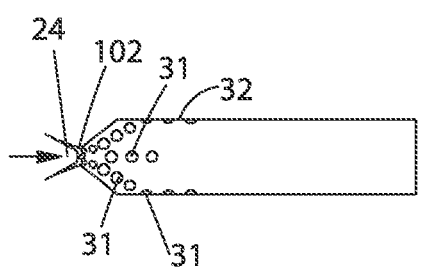
FIGS. 5A-5D are side cross-sectional views of a portion of a thinwall mold cavity in various stages of fill by a conventional injection molding machine.
Figure 5B:
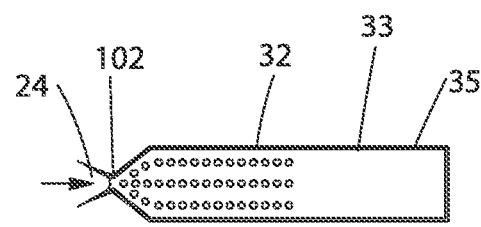
Figure 5C:
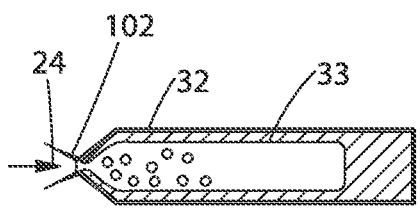
Figure 5D:
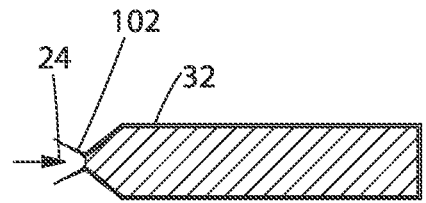
Figure 6A:
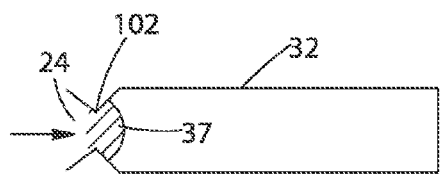
FIGS. 6A-6D are side cross-sectional views of a portion of a thinwall mold cavity in various stages of fill by the injection molding machine of FIG. 1.
Figure 6B:
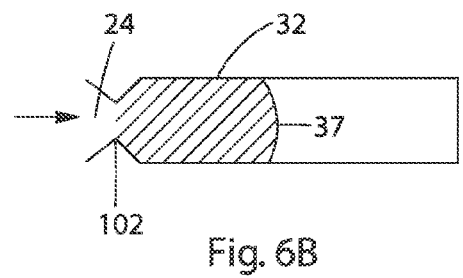
Figure 6C:
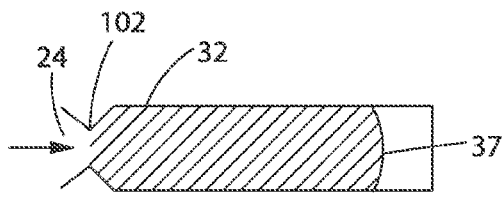
Figure 6D:
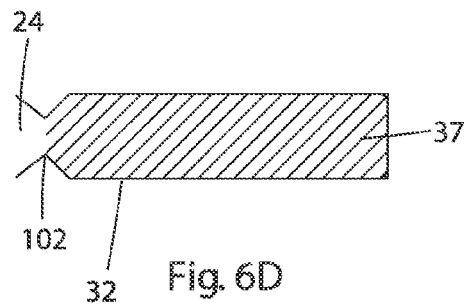

As illustrated in FIGS. 5A-5D, as the conventional injection molding machine begins to inject molten thermoplastic material 24 into a mold cavity 32 through the gate 30, the high injection pressure tends to inject the molten thermoplastic material 24 into the mold cavity 32 at a high rate of speed, which causes the molten thermoplastic material 24 to flow in laminates 31, most commonly referred to as laminar flow (FIG. 5A). These outermost laminates 31 adhere to walls of the mold cavity and subsequently cool and freeze, forming a frozen boundary layer 33 (FIG. 5B), before the mold cavity 32 is completely full. As the thermoplastic material freezes, however, it also shrinks away from the wall of the mold cavity 32, leaving a gap 35 between the mold cavity wall and the boundary layer 33. This gap 35 reduces cooling efficiency of the mold. Molten thermoplastic material 24 also begins to cool and freeze in the vicinity of the gate 30, which reduces the effective cross-sectional area of the gate 30. In order to maintain a constant volumetric flow rate, the conventional injection molding machine must increase pressure to force molten thermoplastic material through the narrowing gate 30. As the thermoplastic material 24 continues to flow into the mold cavity 32, the boundary layer 33 grows thicker (FIG. 5C). Eventually, the entire mold cavity 32 is substantially filled by thermoplastic material that is frozen (FIG. 5D). At this point, the conventional high pressure injection molding machine must maintain a packing pressure to push the receded boundary layer 33 back against the mold cavity 32 walls to increase cooling.

A low constant pressure injection molding machine, on the other hand, flows molten thermoplastic material into a mold cavity 32 with a constantly moving flow front 37 (FIGS. 6A-6D). The thermoplastic material 24 behind the flow front 37 remains molten until the mold cavity 37 is substantially filled (i.e., 99% or more filled) before freezing. As a result, there is no reduction in effective cross-sectional area of the gate 30, which may be between 70% and 100%, preferably between 80% and 90%, of the nominal wall thickness of the molded part. Moreover, because the thermoplastic material 24 is molten behind the flow front 37, the thermoplastic material 24 remains in contact with the walls of the mold cavity 32. As a result, the thermoplastic material 24 is cooling (without freezing) during the fill portion of the molding process. Thus, the cooling portion of the disclosed low constant pressure injection molding process need not be as long as a conventional process.

Because the thermoplastic material remains molten and keeps moving into the mold cavity 32, less injection pressure is required than in conventional molds. In one embodiment, the injection pressure may be 15,000 psi or less. As a result, the injection systems and clamping systems need not be as powerful. For example, the disclosed low constant pressure injection molding devices may use clamps requiring lower clamping forces, and a corresponding lower clamping power source.

Moreover, the disclosed low constant pressure injection molding machines, because of the lower power requirements, may employ electric presses, which are generally not powerful enough to use in conventional class 101 and 102 injection molding machines that mold thinwall parts at high variable pressures. Even when electric presses are sufficient to use for some simple, molds with few mold cavities, the process may be improved with the disclosed low constant pressure injection molding methods and devices as smaller, less expensive electric motors may be used. The disclosed low constant pressure injection molding machines may comprise one or more of the following types of electric presses, a direct servo drive motor press, a dual motor belt driven press, a dual motor planetary gear press, and a dual motor ball drive press having a power rating of 200 HP or less.

Figure 7:
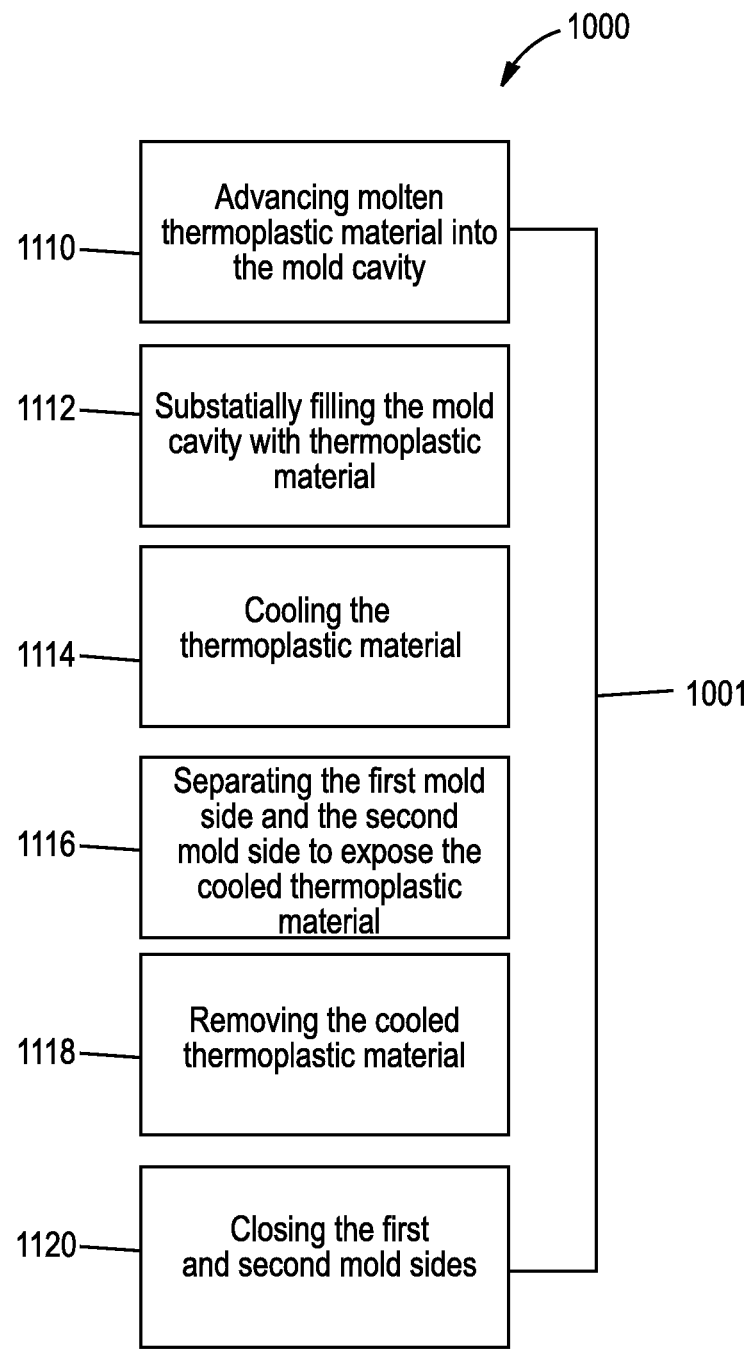
FIG. 7 is a schematic illustration of an injection molding cycle that may be carried out on the injection molding machine of FIG. 1.

Turning now to FIG. 7, operation of an example molding cycle 1000 for the low constant pressure injection molding process is illustrated. The molding cycle 1000 may be carried out on a low constant pressure injection molding machine constructed in accordance with the disclosure, for example, on the low constant pressure injection molding machine of FIG. 1. More specifically, the example molding cycle 1000 may be carried out on a low constant pressure injection molding machine having a mold including a first mold side and a second mold side, at least one of the first mold side and the second mold side having an average thermal conductivity of more than 51.9 W/m-° C. (30 BTU/HR FT ° F.) and less than or equal to 385.79 W/m-° C. (223 BTU/HR FT ° F.), and a mold cavity that is formed between the first mold side and the second mold side. In some preferred embodiments, both the first and second mold side may have an average thermal conductivity of more than 51.9 W/m-° C. (30 BTU/HR FT ° F.) and less than or equal to 385.79 W/m-° C. (223 BTU/HR FT ° F.).

Some preferred materials for manufacturing the first and/or second mold sides include aluminum (for example, 2024 aluminum, 2090 aluminum, 2124 aluminum, 2195 aluminum, 2219 aluminum, 2324 aluminum, 2618 aluminum, 5052 aluminum, 5059 aluminum, aircraft grade aluminum, 6000 series aluminum, 6013 aluminum, 6056 aluminum, 6061 aluminum, 6063 aluminum, 7000 series aluminum, 7050 aluminum, 7055 aluminum, 7068 aluminum, 7075 aluminum, 7076 aluminum, 7150 aluminum, 7475 aluminum, QC-10, Alumold™, Hokotol™, Duramold 2™, Duramold 5™, and Alumec 99™), BeCu (for example, C17200, C 18000, C61900, C62500, C64700, C82500, Moldmax LH™, Moldmax HH™, and Protherm™), Copper, and any alloys of aluminum (e.g., Beryllium, Bismuth, Chromium, Copper, Gallium, Iron, Lead, Magnesium, Manganese, Silicon, Titanium, Vanadium, Zinc, Zirconium), any alloys of copper (e.g., Magnesium, Zinc, Nickel, Silicon, Chromium, Aluminum, Bronze). These materials may have Rockwell C (Rc) hardnesses of between 0.5 Rc and 20 Rc, preferably between 2 Rc and 20 Rc, more preferably between 3 Rc and 15 Rc, and more preferably between 4Rc and 10 Rc. While these materials may be softer than tool steels, the thermal conductivity properties are more desirable. The disclosed low constant pressure injection molding methods and devices advantageously operate under molding conditions that allow molds made of these softer, higher thermal conductivity, materials to extract useful lives of more than 1 million cycles, preferably between 1.25 million cycles and 10 million cycles, and more preferably between 2 million cycles and 5 million cycles.

Initially, molten thermoplastic material is advanced into a mold cavity that defines a thin-walled part (e.g., 100<L/T<1000) at 1110. A shot of molten thermoplastic material may be between 0.5 g and 100 g and may be advanced through three or fewer gates into the mold cavity. In some cases one or more of the three of fewer gates may have a cross-sectional area that is between 70% and 100% of a nominal wall thickness of a part that is formed in the mold cavity, and preferably between 80% and 90% of the nominal wall thickness. In some examples, this percentage may correspond to a gate size of between 0.5 mm and 10 mm.

Molten thermoplastic material is advanced into the mold cavity until the mold cavity is substantially filled at 1112. The mold cavity may be substantially filled when the mold cavity is more than 90% filled, preferably more than 95% filled and more preferably more than 99% filled. After the mold cavity is substantially filled, the molten thermoplastic material is cooled at 1114 until the molten thermoplastic material is substantially frozen or solidified. The molten thermoplastic material may be actively cooled with a cooling liquid flowing through at least one of the first and second mold sides, or passively cooled through convection and conduction to the atmosphere.

After the thermoplastic material is cooled, the first and second mold sides may be separated to expose the cooled thermoplastic material at 1116. The cooled thermoplastic material (in the form of the molded part) may be removed from the mold at 1118. The thermoplastic material may be removed by, for example, ejection, dumping, extraction (manually or via an automated process), pulling, pushing, gravity, or any other method of separating the cooled thermoplastic material from the first and second mold sides.

After the cooled thermoplastic material is removed from the first and second mold sides, the first and second mold sides may be closed, reforming the mold cavity, at 1120, which prepares the first and second mold sides to receive a new shot of molten thermoplastic material, thereby completing a single mold cycle. Cycle time 1001 is defined as a single iteration of the molding cycle 1000. A single molding cycle may take between 2 seconds and 15 seconds, preferably between 8 seconds and 10 seconds, depending on the part size and material.

All injection molding processes are susceptible to variations in the viscosity of the molten plastic material. Variations in the viscosity of the molten plastic material may cause imperfections in the molded part, such as insufficient material (short shot), and flashing. Any number of factors can cause the viscosity of the molten plastic material to vary. For example, changes in ambient temperature or pressure, the addition of a colorant, changes in shear conditions between the feed system and the last cavity location to fill with molten plastic material (otherwise known as the "end of fill location"), viscosity variations in the virgin plastic material itself and changes in other conditions all may cause the viscosity of the molten plastic material to change. As viscosity of the molten plastic material changes, pressure required to force the molten plastic into the mold will also change. For example, if viscosity increases, pressure required to force the polymer into the mold cavity will increase because the polymer is thicker and harder to move into the mold cavity. On the other hand, as viscosity decreases, pressure required force the polymer into the mold cavity will decrease because the polymer is thinner and easier to move into the mold cavity. If no adjustments are made to the injection pressure or the cycle time, the molded part will have flaws. Current injection molding machines and processes have molding cycles that are time-based. In other words, the molding cycle is controlled by time, among other factors, as the injection molding cycle is ended at a predetermined time. As a result, changes in viscosity to the molten plastic material will cause the molten plastic material to reach in end of the mold cavity at a time that is different from the predetermined time.

Figure 8:
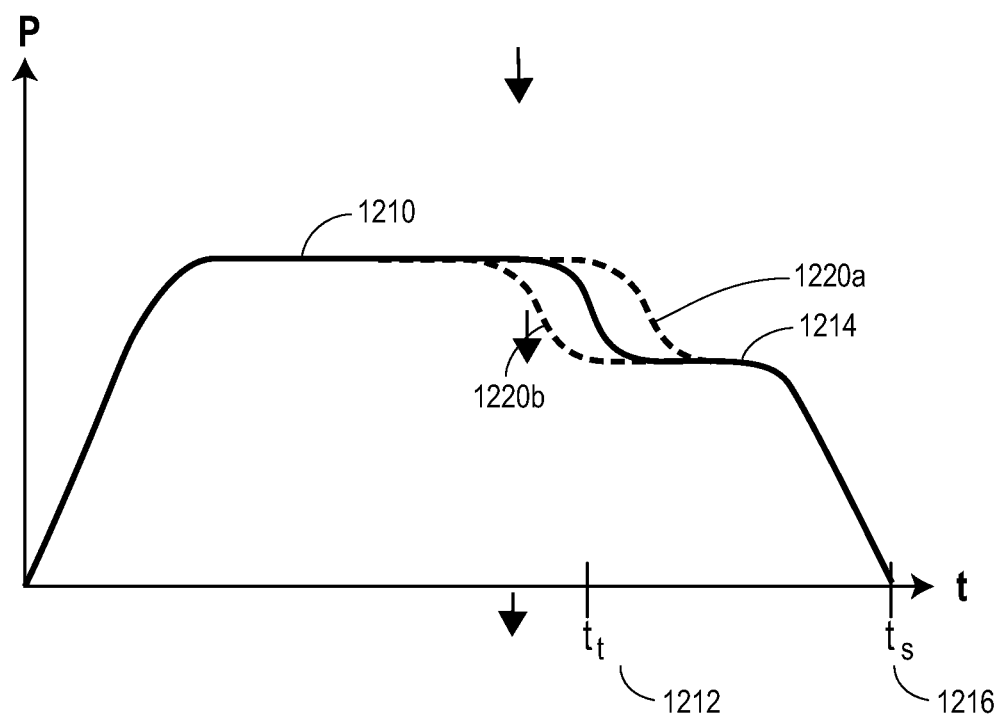
FIG. 8 is a pressure vs. time graph for an injection molding machine that illustrates the effect of variations in viscosity of the molten plastic material.

Turning now to FIG. 8, a pressure versus time graph is illustrated for a single injection molding cycle. During an initial phase of the injection molding cycle pressure rapidly increases to a predetermined target value 1210 (e.g., a "fill pressure"), where the pressure is held as the mold cavity is filled. When molten plastic material nears the end of the mold cavity 32, as indicated by the flow front sensor 53 (FIG. 1), at a first time $t_t$ (or $t_{transducer}$) 1212, pressure is reduced slightly at 1214 to a lower pressure (e.g., a "pack and hold pressure") as the material in the mold cavity 32 cools. At a second time $t_s$ (or $t_{step}$) 1216, which is a total cycle time from initiation of the filling sequence to an end of the filling cycle where the mold is opened in the molded part is ejected from the mold cavity 32.

Changes in viscosity of the molten plastic material may affect the time at which the molten plastic material reaches the end of the mold cavity 32 or the end of fill location in the mold cavity at $t_s$. For example, if viscosity of the molten plastic material increases, (with the possibility of a "short shot"), then the molten plastic material may be maintained at the fill pressure for a longer time, as illustrated by dashed line 1220a. In this example, the flow front sensor 53 may detect the molten plastic material at a time that is later than a predetermined time. A predetermined time for the molten plastic to reach the flow front sensor may be calculated or derived experimentally for ideal conditions and constant viscosity for the molten plastic material. On the other hand, if viscosity of the molten plastic material decreases, (with the possibility of "flashing"), then the molten plastic material may be maintained at the fill pressure for a shorter time, as illustrated by the dashed line 1220b. In this example, the flow front sensor 53 may detect molten plastic material at a time $t_t$ that is earlier than the predetermined time.

Figure 9:
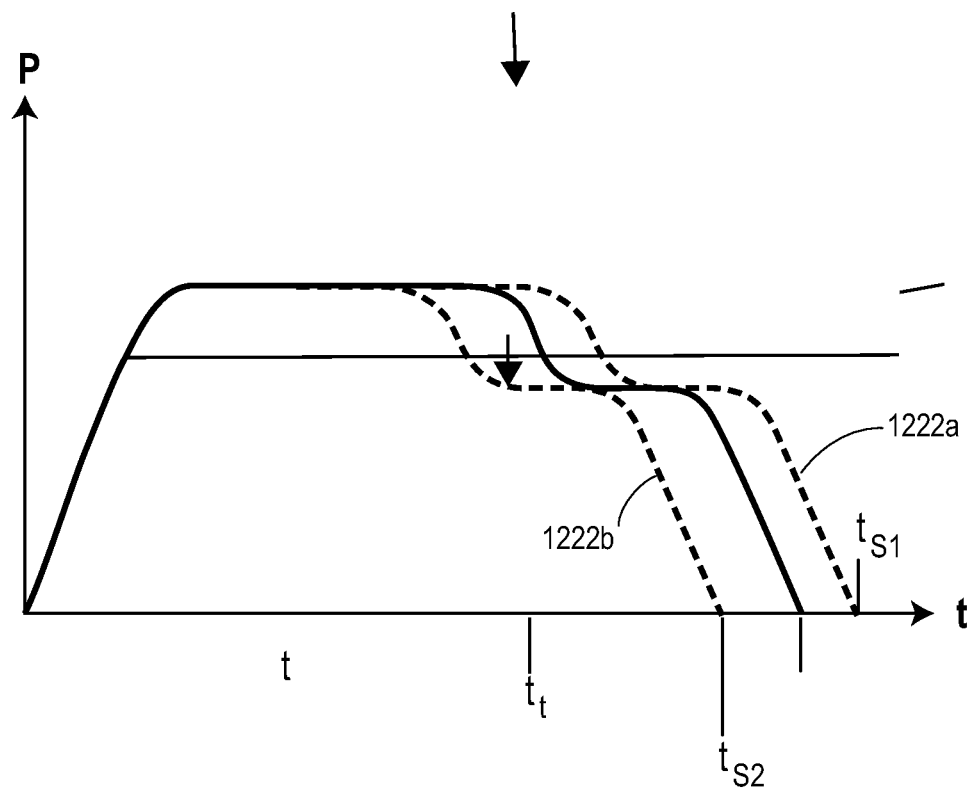
FIG. 9 is a pressure vs. time graph for an injection molding machine that illustrates step time adjustments that may be made by a controller to ensure that the mold cavity is filled correctly and that the molten plastic material completely fills the mold cavity based on changes in the viscosity of the molten plastic material.

In order to compensate for problems caused by changes in viscosity, the controller 50 (FIG. 1) may cause the screw control 26 (FIG. 1) to increase or decrease the step time ($t_s$) based on the change in viscosity to ensure that the mold cavity 32 is completely filled with molten plastic without being overfilled. Turning now to FIG. 9, a corrected pressure versus time graph is illustrated. For example, if viscosity of the molten plastic material increases, the controller 50 instructs the screw control 26 to increase step time, as illustrated by line 1222a, resulting in a new step time ($t_{s1}$) that is longer than the predetermined step time. On the other hand, if viscosity of the molten plastic material decreases, the controller 50 instructs the screw control 26 to decrease step time, as illustrated by line 1222b, resulting in a new step time ($t_{s2}$) that is shorter than the predetermined step time. By increasing step time as viscosity increases, or by decreasing step time is viscosity decreases, the system ensures that the injection molding cycle is ended at the time at which molten plastic material reaches is completely packed, without the mold cavity being overfilled. As a result, problems due to changes in viscosity, such as, short shots and flashing, are reduced or eliminated.

Figure 10:
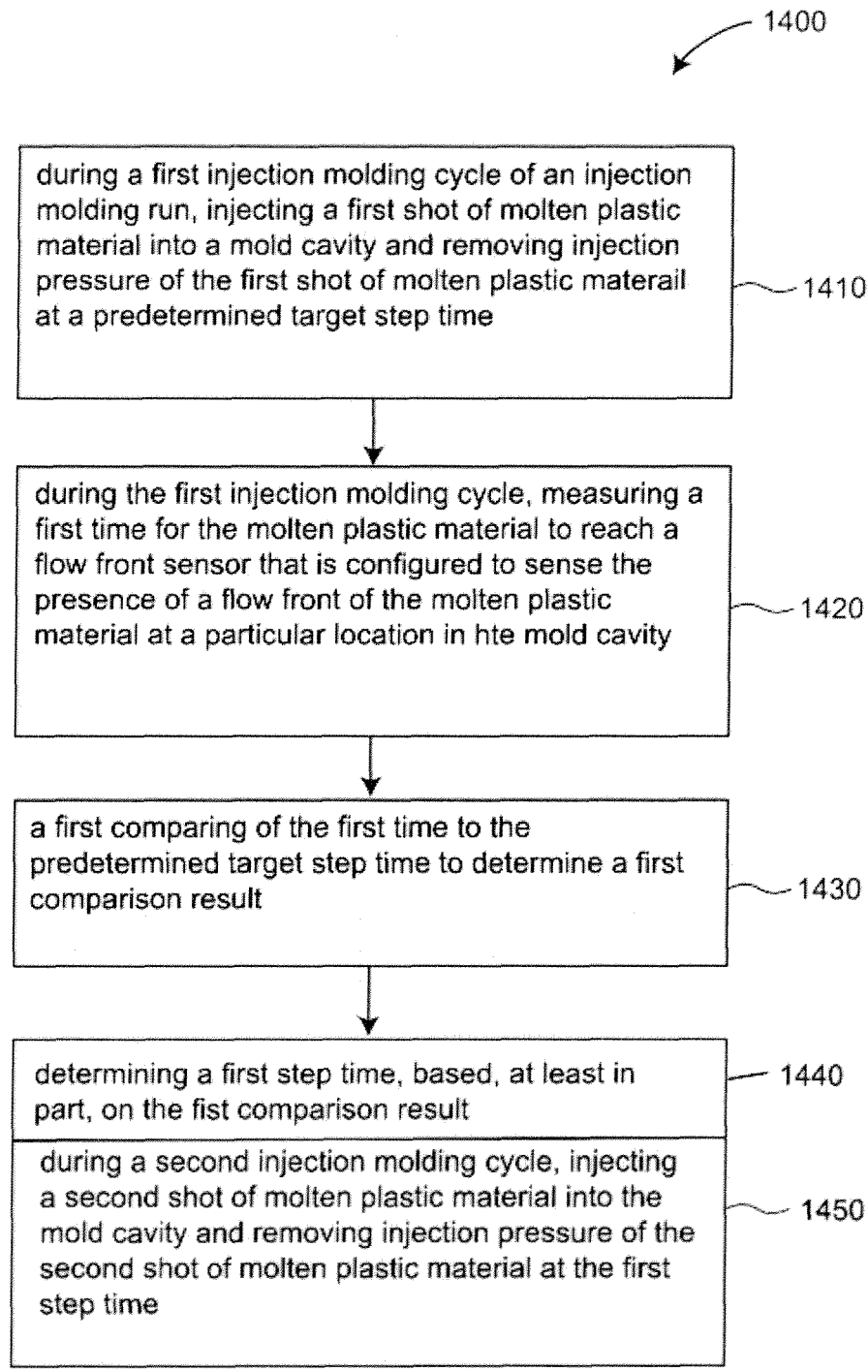
FIG. 10 is a logic diagram that illustrates an injection molding process that accounts for viscosity changes in the molten plastic material.

Turning now to FIG. 10, the logic diagram of the process 1400 for accounting for changes in flowability of the molten plastic material is illustrated. A first shot of molten plastic material is injected into the mold cavity 32 at a predetermined target injection (or fill) pressure, and pressure on the first shot of molten plastic material is removed so that the first mold cycle has a first step time at 1410. The flow front sensor 53 sends a signal to the controller 50 indicative of when the flow front of the molten plastic material passes the flow front sensor 53 at 1420. The controller 50 compares the first time to a predetermined time. The controller 50 then calculates a step time correction that is required to compensate for the difference between the first time and the predetermined time at 1440. During a second subsequent molding cycle the controller 50 instructs the screw controller 26 to remove injection pressure from a second shot of molten plastic material so that the second mold cycle has a second step time that is different from the first step time at 1450, and the second step time is based on the difference between the first time and the predetermined time. The controller 50 may continue to compare such times and to make subsequent step time adjustments based on the difference between the two.

The second subsequent molding cycle may be immediately subsequent to the first molding cycle. Alternatively, the first molding cycle and the second molding cycle may be separated by one or more intervening molding cycles.

The controller may average (or otherwise combine) the times over two or more molding cycles and calculate a step time correction that may be applied to a third subsequent molding cycle. Furthermore, the controller 50 may employ other control methodology including, but not limited to, statistical control methodology utilizing moving or non-moving averages, control charting, and the elimination of statistically outlying data points.

In some cases, the second step time may be proportional to the difference between the first time and the predetermined time. When viscosity of the molten plastic material increases, the second step time will be greater. On the other hand, when viscosity of the molten plastic material decreases, the second step time will be less. The second step time will generally be between 350% greater than and 75% less than the first step time.

In some cases, the controller 50 may average the second time with the first time and then compare the average to the predetermined time. By using an average, the controller 50 may smooth changes to the step times, thereby enhancing uniformity of part quality, while still accounting for changes in viscosity.

Figure 11:
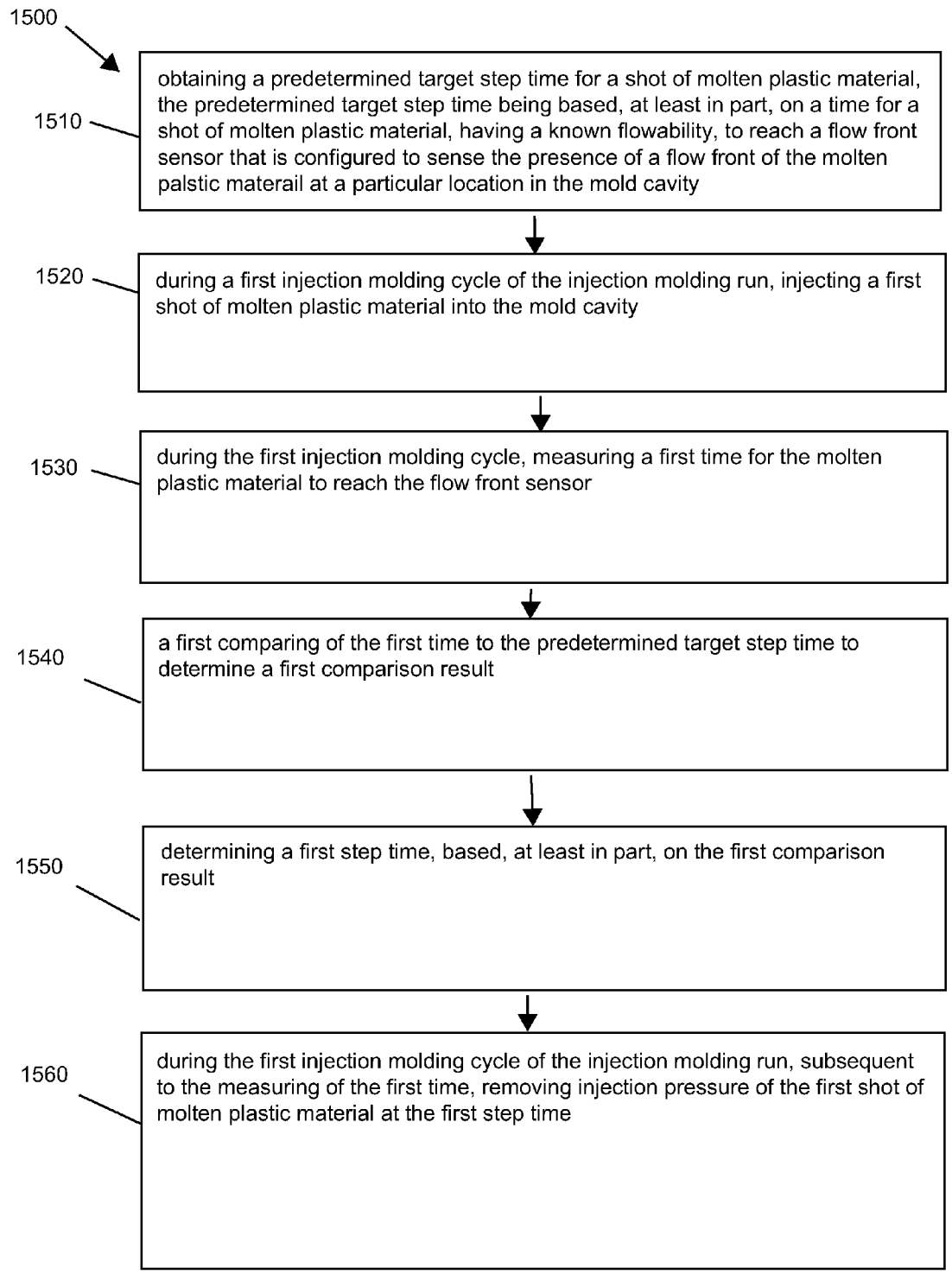
FIG. 11 is a logic diagram of an alternate embodiment of an injection molding process that accounts for viscosity changes in the molten plastic material.

Turning now to FIG. 11, an alternate embodiment of a logic diagram for a process 1500 for accounting for changes in flowability of the molten plastic material is illustrated. The main difference from the previous embodiment of FIG. 10 is that the process of FIG. 11 adjusts the step time intracycle. In other words, the process of FIG. 11 calculates an adjusted step time within a single cycle. The embodiments of FIG. 10 and FIG. 11 may be combined to result in a process that calculates a revised step time during a first cycle and then continues calculating a revised step time for each subsequent cycle. The combination of the two disclosed processes may result in a process that calculates an adjusted step time both intracycle and intercycle. Furthermore, any of the modifications to the process described with reference to FIG. 10, may also modify the process described below with reference to FIG. 11.

Initially, a predetermined time may be obtained at 1510. The predetermined time may be for a shot of molten plastic material having a known flowability. The predetermined time may be calculated by a processor, or input by a user into an injection molding system. After obtaining the predetermined time, a first shot of molten plastic material may be injected into a mold cavity at 1520. During the first injection molding cycle, a first time for the molten plastic material to reach the flow front sensor may be measured at 1530. Thereafter, the first time may be compared with the predetermined time to produce a first comparison result at 1540. A first step time may be determined at 1550. The first step time by be based, at least in part, on the first comparison result. Subsequent to the measuring of the first time, injection pressure may be removed from the first shot of molten plastic material at the first step time at 1560, during the first injection molding cycle.

As an example, an injection molding machine was run for three different injection molding cycles. Each injection molding cycle included a material having a different Melt Flow Index ("MFI"), which represent different material flowabilities. The results are summarized in the table below.

|  | Low Constant Pressure Processing 8600 IMP (Standard) | | |
| --- | --- | --- | --- |
| Mat'l (PP) MFI | 11 | 20 | 30 |
| Fill Time (s) | 2.499 | 1.454 | 0.719 |
| Range Fill Time (s) |  |  | 1.78 s |
| Mean Part WT (g) | 14.113 | 14.264 | 14.398 |
| Part Wt. Stdev | 0.0702 | 0.0602 | 0.0633 |
| Peak Cav P (psi) | 920 | 1213 | 1487 |
| Melt P at Fill Time (psi) | 8648 | 8690 | 8749 |
| Peak Melt P (psi) | 8679 | 8698 | 8789 |

As illustrated in the table above, the material with an 11 MFI took approximately 2.499 seconds to completely fill the mold cavity while the material with a 30 MFI took only 0.719 seconds to completely fill the mold cavity. The times to fill the mold cavity in this example varied within the range of +350% to −75%. The injection molding methods described herein account for these differences in fill time and adjust the cycle step times accordingly to reliably produce better quality parts.

As discussed above, changes in the viscosity of the molten plastic material may be caused by any number of factors. For example, an operator may desire to reuse poor quality parts by re-grinding the poor quality parts and mixing the reground plastic material with virgin plastic material. Mixing of regrind and virgin plastic material will change the MFI of the combined material. Similarly, an operator may desire to change part color during an injection run by introducing a colorant into the molten plastic material. The introduction of a colorant will often change the MFI of the molten plastic material. Finally, changes in ambient operating conditions can also change the viscosity of the molten plastic material. For example, if ambient temperature increases, viscosity of the molten plastic material often increases. Likewise, if ambient temperature decreases, viscosity the molten plastic material often decreases.

The disclosed low constant pressure injection molding methods and machines advantageously reduce cycle time for the molding process while increasing part quality. Moreover, the disclosed low constant pressure injection molding machines may employ, in some embodiments, electric presses, which are generally more energy efficient and require less maintenance than hydraulic presses. Additionally, the disclosed low constant pressure injection molding machines are capable of employing more flexible support structures and more adaptable delivery structures, such as wider platen widths, increased tie bar spacing, elimination of tie bars, lighter weight construction to facilitate faster movements, and non-naturally balanced feed systems. Thus, the disclosed low constant pressure injection molding machines may be modified to fit delivery needs and are more easily customizable for particular molded parts.

Additionally, the disclosed low constant pressure injection molding machines and methods allow the molds to be made from softer materials (e.g., materials having a Rc of less than about 30), which may have higher thermal conductivities (e.g., thermal conductivities greater than about 20

BTU/HR FT ° F.), which leads to molds with improved cooling capabilities and more uniform cooling. Because of the improved cooling capabilities, the disclosed low constant pressure injection molds may include simplified cooling systems. Generally speaking, the simplified cooling systems include fewer cooling channels and the cooling channels that are included may be straighter, having fewer machining axes. One example of an injection mold having a simplified cooling system is disclosed in U.S. Patent Application No. 61/602,781, filed Feb. 24, 2012, which is hereby incorporated by reference herein.

The lower injection pressures of the low constant pressure injection molding machines allow molds made of these softer materials to extract 1 million or more molding cycles, which would not be possible in conventional injection molding machines as these materials would fail before 1 million molding cycles in a high pressure injection molding machine.

It is noted that the terms "substantially," "about," and "approximately," unless otherwise specified, may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 20% of the stated reference.

It should now be apparent that the various embodiments of the products illustrated and described herein may be produced by a low, substantially constant pressure molding process. While particular reference has been made herein to products for containing consumer goods or consumer goods products themselves, it should be apparent that the molding method discussed herein may be suitable for use in conjunction with products for use in the consumer goods industry, the food service industry, the transportation industry, the medical industry, the toy industry, and the like. Moreover, one skilled in the art will recognize the teachings disclosed herein may be used in the construction of stack molds, multiple material molds including rotational and core back molds, in combination with in-mold decoration, insert molding, in mold assembly, and the like.

Part, parts, or all of any of the embodiments disclosed herein can be combined with part, parts, or all of other injection molding embodiments known in the art, including those described below.

Embodiments of the present disclosure can be used with embodiments for injection molding at low constant pressure, as disclosed in U.S. patent application Ser. No. 13/476,045 filed May 21, 2012, entitled "Apparatus and Method for Injection Molding at Low Constant Pressure" (applicant's case 12127) and published as US 2012-0294963 A1, which is hereby incorporated by reference.

Embodiments of the present disclosure can be used with embodiments for pressure control, as disclosed in U.S. patent application Ser. No. 13/476,047 filed May 21, 2012, entitled "Alternative Pressure Control for a Low Constant Pressure Injection Molding Apparatus" (applicant's case 12128) now U.S. Pat. No. 8,757,999, which is hereby incorporated by reference.

Embodiments of the present disclosure can be used with embodiments for non-naturally balanced feed systems, as disclosed in U.S. patent application Ser. No. 13/476,073 filed May 21, 2012, entitled "Non-Naturally Balanced Feed System for an Injection Molding Apparatus" (applicant's case 12130) and published as US 2012-0292823 A1, which is hereby incorporated by reference.

Embodiments of the present disclosure can be used with embodiments for injection molding at low, substantially constant pressure, as disclosed in U.S. patent application Ser. No. 13/476,197 filed May 21, 2012, entitled "Method for Injection Molding at Low, Substantially Constant Pressure" (applicant's case 12131Q) and published as US 2012-0295050 A1, which is hereby incorporated by reference.

Embodiments of the present disclosure can be used with embodiments for injection molding at low, substantially constant pressure, as disclosed in U.S. patent application Ser. No. 13/476,178 filed May 21, 2012, entitled "Method for Injection Molding at Low, Substantially Constant Pressure" (applicant's case 12132Q) and published as US 2012-0295049 A1, which is hereby incorporated by reference.

Embodiments of the present disclosure can be used with embodiments for co-injection processes, as disclosed in U.S. patent application Ser. No. 13/774,692 filed Feb. 22, 2013, entitled "High Thermal Conductivity Co-Injection Molding System" (applicant's case 12361), which is hereby incorporated by reference.

Embodiments of the present disclosure can be used with embodiments for molding with simplified cooling systems, as disclosed in U.S. patent application Ser. No. 13/765,428 filed Feb. 12, 2013, entitled "Injection Mold Having a Simplified Evaporative Cooling System or a Simplified Cooling System with Exotic Cooling Fluids" (applicant's case 12453M), now U.S. Pat. No. 8,591,219, which is hereby incorporated by reference.

Embodiments of the present disclosure can be used with embodiments for molding thinwall parts, as disclosed in U.S. patent application Ser. No. 13/476,584 filed May 21, 2012, entitled "Method and Apparatus for Substantially Constant Pressure Injection Molding of Thinwall Parts" (applicant's case 12487), which is hereby incorporated by reference.

Embodiments of the present disclosure can be used with embodiments for molding with a failsafe mechanism, as disclosed in U.S. patent application Ser. No. 13/672,246 filed Nov. 8, 2012, entitled "Injection Mold With Fail Safe Pressure Mechanism" (applicant's case 12657), which is hereby incorporated by reference.

Embodiments of the present disclosure can be used with embodiments for high-productivity molding, as disclosed in U.S. patent application Ser. No. 13/682,456 filed Nov. 20, 2012, entitled "Method for Operating a High Productivity Injection Molding Machine" (applicant's case 12673R), which is hereby incorporated by reference.

Embodiments of the present disclosure can be used with embodiments for molding certain thermoplastics, as disclosed in U.S. patent application Ser. No. 14/085,515 filed Nov. 20, 2013, entitled "Methods of Molding Compositions of Thermoplastic Polymer and Hydrogenated Castor Oil" (applicant's case 12674M), which is hereby incorporated by reference.

Embodiments of the present disclosure can be used with embodiments for runner systems, as disclosed in U.S. patent application Ser. No. 14/085,515 filed Nov. 21, 2013, entitled "Reduced Size Runner for an Injection Mold System" (applicant's case 12677M), which is hereby incorporated by reference.

Embodiments of the present disclosure can be used with embodiments for moving molding systems, as disclosed in U.S. patent application 61/822,661 filed May 13, 2013, entitled "Low Constant Pressure Injection Molding System with Variable Position Molding Cavities:" (applicant's case 12896P), which is hereby incorporated by reference.

Embodiments of the present disclosure can be used with embodiments for injection mold control systems, as disclosed in U.S. patent application 61/861,298 filed Aug. 20, 2013, entitled "Injection Molding Machines and Methods for Accounting for Changes in Material Properties During Injection Molding Runs" (applicant's case 13020P), which is hereby incorporated by reference.

Embodiments of the present disclosure can be used with embodiments for injection mold control systems, as disclosed in U.S. patent application 61/861,304 filed Aug. 20, 2013, entitled "Injection Molding Machines and Methods for Accounting for Changes in Material Properties During Injection Molding Runs" (applicant's case 13021P), which is hereby incorporated by reference.

Embodiments of the present disclosure can be used with embodiments for injection mold control systems, as disclosed in U.S. patent application 61/861,310 filed Aug. 20, 2013, entitled "Injection Molding Machines and Methods for Accounting for Changes in Material Properties During Injection Molding Runs" (applicant's case 13022P), which is hereby incorporated by reference.

Embodiments of the present disclosure can be used with embodiments for using injection molding to form overmolded articles, as disclosed in U.S. patent application 61/918,438 filed Dec. 19, 2013, entitled "Methods of Forming Overmolded Articles" (applicant's case 13190P), which is hereby incorporated by reference.

Embodiments of the present disclosure can be used with embodiments for controlling molding processes, as disclosed in U.S. Pat. No. 5,728,329 issued Mar. 17, 1998, entitled "Method and Apparatus for Injecting a Molten Material into a Mold Cavity" (applicant's case 12467CC), which is hereby incorporated by reference.

Embodiments of the present disclosure can be used with embodiments for controlling molding processes, as disclosed in U.S. Pat. No. 5,716,561 issued Feb. 10, 1998, entitled "Injection Control System" (applicant's case 12467CR), which is hereby incorporated by reference.

Embodiments of the present disclosure can be used with embodiments for molding preforms, as disclosed in U.S. patent application 61/952,281, entitled "Plastic Article Forming Apparatus and Methods for Using the Same" (applicant's case 13242P), which is hereby incorporated by reference.

Embodiments of the present disclosure can be used with embodiments for molding preforms, as disclosed in U.S. patent application 61/952,283, entitled "Plastic Article Forming Apparatus and Methods for Using the Same" (applicant's case 13243P), which is hereby incorporated by reference. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of automatically adjusting a step time for an injection molding cycle to adapt for variations in the flowability of a molten plastic material, the method comprising:
    (a) during a first molding cycle, injecting a first shot of molten plastic material into a mold cavity;
    (b) during the first injection molding cycle, measuring a first time for the molten plastic material to reach a flow front sensor that is configured to sense the presence of a flow front of the molten plastic material at a particular location in the mold cavity;
    (c) comparing the first time to a predetermined time to determine a first comparison result;
    (d) determining a first step time, based, at least in part, on the first comparison result; and
    (e) during the first molding cycle, removing injection pressure from the first shot of molten plastic material so that the first injection molding cycle has the first step time, wherein the step time is the time from initiation of injection of molten plastic material to just before the mold is opened for ejection.

2. The method of claim 1, including determining the predetermined time, based, at least in part, on a time for a shot of molten plastic material, having known flowability, to reach the flow front sensor.

3. The method of claim 1, wherein the measuring includes measuring the first time from a start of the first injection molding cycle until the flow front sensor detects arrival of the flow front of the molten plastic material.

4. The method of claim 1, wherein the comparing includes determining whether the first time is greater than or less than the predetermined time.

5. The method of claim 4, wherein the first comparing includes comparing the first time to the predetermined time to determine a first comparison result, which is a time difference between the first time and the predetermined time.

6. The method of claim 1, wherein:
    the first comparing includes determining that the first time is greater that the predetermined time; and
    the removing includes removing injection pressure from the first shot of molten plastic material so that the first molding cycle has the first step time, which is greater than a predetermined step time.

7. The method of claim 1, wherein:
    the first comparing includes determining that the first time is less than the predetermined time; and
    the removing includes removing injection pressure from the first shot of molten plastic material so that the first molding cycle has the first step time, which is less than a predetermined step time.

8. The method of claim 1, wherein during the first molding cycle, the measuring includes measuring the first time for the molten plastic material to reach the flow front sensor, which is a transducer.

9. The method of claim 1, wherein during the first molding cycle, the measuring includes measuring the first time for the molten plastic material to reach the flow front sensor, which is located within 30% of an end of the mold cavity.

10. The method of claim 1, wherein during the first molding cycle, the measuring includes measuring the first time for the molten plastic material to reach the flow front sensor, which is located within 20% of an end of the mold cavity.

11. The method of claim 1, wherein during the first molding cycle, the measuring includes measuring the first time for the molten plastic material to reach the flow front sensor, which is located within 10% of an end of the mold cavity.

12. The method of claim 1, wherein during the first injection molding cycle, the measuring includes measuring the first time for the molten plastic material to reach the flow front sensor, which is a sensor configured to directly sense a presence of a flow front of the molten plastic material within the mold cavity.

13. The method of claim 1, wherein the flow front sensor is selected from the group consisting of:
   a temperature sensor,
   an optical sensor,
   an electrical sensor,
   a mechanical sensor,
   an ultrasonic sensor,
   a hydraulic sensor, and
   a pneumatic sensor.

14. The method of claim 1, further comprising:
   (f) during a second molding cycle, which is in an injection molding run that includes the first molding cycle, injecting a second shot of molten plastic material into the mold cavity;
   (g) during the second injection molding cycle, measuring a second time for the molten plastic material to reach the flow front sensor;
   (h) comparing the second time to the predetermined time to determine a second comparison result;
   (o) determining a second step time, based, at least in part, on the second comparison result; and
   (j) during the second molding cycle, removing injection pressure from the second shot of molten plastic material so that the second injection molding cycle has the second step time.

15. The method of claim 1, wherein the second molding cycle immediately follows the first molding cycle, in the injection molding run.

16. The method of claim 1, including for each molding cycle in the injection molding run, automatically adjusting its step time based on a comparison that uses the predetermined time.

17. The method of claim 1, including, for each molding cycle in the injection molding run, automatically adjusting its step time, based on a comparison result that uses a time, in a prior molding cycle, for a shot of the molten plastic material to reach the flow front sensor.

18. The method of claim 1, wherein during the first molding cycle, the molten plastic material is injected into multiple mold cavities.

* * * * *